United States Patent
Monastiriotis et al.

(10) Patent No.: US 11,760,924 B2
(45) Date of Patent: *Sep. 19, 2023

(54) PROPPANT WITH ENHANCED INTERPARTICLE BONDING

(71) Applicant: PREFERRED TECHNOLOGY, LLC, Radnor, PA (US)

(72) Inventors: Spyridon Monastiriotis, Dallas, TX (US); Robert Ray McDaniel, Cypress, TX (US); Avis Lloyd McCrary, Montgomery, TX (US); Ralph Edward Barthel, Wake Forest, NC (US)

(73) Assignee: Preferred Technology, LLC, Radnor, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/371,974

(22) Filed: Jul. 9, 2021

(65) Prior Publication Data

US 2021/0403801 A1  Dec. 30, 2021

Related U.S. Application Data

(63) Continuation of application No. 16/124,742, filed on Sep. 7, 2018, now Pat. No. 11,098,242, which is a continuation of application No. 13/897,288, filed on May 17, 2013, now Pat. No. 10,100,247.

(51) Int. Cl.
*C09K 8/80* (2006.01)
*C09K 8/68* (2006.01)

(52) U.S. Cl.
CPC ............... *C09K 8/805* (2013.01); *C09K 8/68* (2013.01); *C09K 2208/28* (2013.01); *Y10T 428/2991* (2015.01)

(58) Field of Classification Search
CPC .................... C09K 8/805; Y10T 428/2991
See application file for complete search history.

(56) References Cited

U.S. PATENT DOCUMENTS

| | | |
|---|---|---|
| 2,163,972 A | 6/1939 | Anderson |
| 2,366,007 A | 12/1944 | D'Alelio |
| 2,653,089 A | 9/1953 | Bulson |
| 2,823,753 A | 2/1958 | Henderson |
| 3,020,250 A | 2/1962 | Norwalk |
| 3,026,938 A | 3/1962 | Huitt |
| 3,392,148 A | 7/1968 | Hunter |
| 3,492,147 A | 1/1970 | Young et al. |
| 3,763,072 A | 10/1973 | Krieger |
| 3,805,531 A | 4/1974 | Kistner |
| 3,817,939 A | 6/1974 | Allen et al. |
| 3,837,892 A | 9/1974 | Marzocchi |
| 3,900,611 A | 8/1975 | Corbett et al. |
| 3,929,191 A | 12/1975 | Graham et al. |
| 3,931,428 A | 1/1976 | Reick |
| 3,971,751 A | 7/1976 | Isayama et al. |
| 3,976,135 A | 8/1976 | Anderson |
| 3,991,225 A | 11/1976 | Blouin |
| 4,074,760 A | 2/1978 | Copeland et al. |
| 4,079,041 A | 3/1978 | Baumann et al. |
| 4,102,703 A | 7/1978 | Tully |
| 4,113,014 A | 9/1978 | Kubens et al. |
| 4,150,005 A | 4/1979 | Gehman et al. |
| 4,177,228 A | 12/1979 | Prolss |
| 4,199,484 A | 4/1980 | Murphey |
| 4,228,042 A | 10/1980 | Letton |
| 4,239,660 A | 12/1980 | Kingry |
| 4,252,655 A | 2/1981 | Carney |
| 4,260,529 A | 4/1981 | Letton |
| 4,273,910 A | 6/1981 | Lederer |
| 4,417,992 A | 11/1983 | Bhattacharyya et al. |
| 4,439,489 A | 3/1984 | Johnson et al. |

(Continued)

FOREIGN PATENT DOCUMENTS

| | | |
|---|---|---|
| CA | 1087833 A | 10/1980 |
| CA | 2423031 A1 | 10/2003 |

(Continued)

OTHER PUBLICATIONS

Non-final Office Action dated Sep. 8, 2017 in U.S. Appl. No. 14/713,235.
Non-final Office Action dated Nov. 24, 2017 in U.S. Appl. No. 15/070,819.
Non-final Office Action dated Jan. 19, 2018 in U.S. Appl. No. 15/345,283.
Non-Final Office Action dated Jul. 25, 2019 in U.S. Appl. No. 14/928,379.
Non-Final Office Action dated Apr. 2, 2020 in U.S. Appl. No. 16/124,742.

(Continued)

*Primary Examiner* — Hoa (Holly) Le
(74) *Attorney, Agent, or Firm* — Troutman Pepper Hamilton Sanders LLP

(57) ABSTRACT

Polymer-coated proppants for hydraulic fracturing of oil and gas wells have an outer layer portion that comprises an organofunctional coupling agent, preferably an organofunctional silane coupling agent. The use of an organofunctional silane coupling agent in the outer layer portion of the proppant coating is preferably chosen to expose functionalities that will be reactive towards similar functionalities of adjacent and similarly coated proppants so that, when introduced downhole, these proppants form interparticle bonds at the temperatures and crack closure pressures found downhole in fractured strata. Such enhanced interparticle bonding helps keep the proppant in the fracture and maintains conductivity with reduced flowback. The invention also helps proppants designed for low temperature well to bond more firmly and allows proppants designed for high temperature wells to bond well even at lower downhole temperatures, thereby extending their useful range.

20 Claims, No Drawings

(56) References Cited

U.S. PATENT DOCUMENTS

| | | |
|---|---|---|
| 4,443,347 A | 4/1984 | Underdown et al. |
| 4,465,815 A | 8/1984 | Chattha |
| 4,493,875 A | 1/1985 | Beck et al. |
| 4,517,330 A | 5/1985 | Zdanowski et al. |
| 4,518,039 A | 5/1985 | Graham et al. |
| 4,547,469 A | 10/1985 | Jackson et al. |
| 4,553,596 A | 11/1985 | Graham et al. |
| 4,554,188 A | 11/1985 | Holubka et al. |
| 4,580,633 A | 4/1986 | Watkins et al. |
| 4,585,064 A | 4/1986 | Graham et al. |
| 4,592,931 A | 6/1986 | Cargle |
| 4,594,268 A | 6/1986 | Kirwin |
| 4,623,589 A | 11/1986 | Simmonds, Jr. |
| 4,632,876 A | 12/1986 | Laird et al. |
| 4,680,230 A | 7/1987 | Gibb et al. |
| 4,732,920 A | 3/1988 | Graham et al. |
| 4,746,543 A | 5/1988 | Zinkan et al. |
| 4,785,884 A | 11/1988 | Armbruster |
| 4,792,262 A | 12/1988 | Kapps et al. |
| 4,801,635 A | 1/1989 | Zinkan et al. |
| 4,822,425 A | 4/1989 | Burch |
| 4,920,192 A | 4/1990 | Wiser-Halladay |
| 5,043,484 A | 8/1991 | Knifton et al. |
| 5,048,608 A | 9/1991 | Wiser-Halladay et al. |
| 5,073,195 A | 12/1991 | Cuthbert et al. |
| 5,092,404 A | 3/1992 | Falk et al. |
| 5,138,055 A | 8/1992 | Parekh |
| 5,159,123 A | 10/1992 | Knifton et al. |
| 5,181,957 A | 1/1993 | Gross et al. |
| 5,188,175 A | 2/1993 | Sweet |
| 5,194,174 A | 3/1993 | Roe et al. |
| 5,199,491 A | 4/1993 | Kutta et al. |
| 5,218,038 A | 6/1993 | Johnson et al. |
| 5,242,248 A | 9/1993 | Bramwell |
| 5,256,729 A | 10/1993 | Kutta et al. |
| 5,264,572 A | 11/1993 | Endo et al. |
| 5,330,836 A | 7/1994 | Buese et al. |
| 5,376,629 A | 12/1994 | Smith |
| 5,420,174 A | 5/1995 | Dewprashad |
| 5,422,183 A | 6/1995 | Sinclair et al. |
| 5,480,584 A | 1/1996 | Urano et al. |
| 5,494,599 A | 2/1996 | Goovaerts et al. |
| 5,582,249 A | 12/1996 | Caveny et al. |
| 5,597,784 A | 1/1997 | Sinclair et al. |
| 5,663,136 A | 9/1997 | Van Dijk et al. |
| 5,721,315 A | 2/1998 | Evans et al. |
| 5,728,302 A | 3/1998 | Connor et al. |
| 5,733,952 A | 3/1998 | Geoffrey |
| 5,824,462 A | 10/1998 | Ashida et al. |
| 5,837,656 A | 11/1998 | Sinclair et al. |
| 5,849,818 A | 12/1998 | Walles et al. |
| 5,856,271 A | 1/1999 | Cataldo et al. |
| 5,869,570 A | 2/1999 | Eaton et al. |
| 5,911,876 A | 6/1999 | Rose |
| 5,924,488 A | 7/1999 | Nguyen et al. |
| 5,935,923 A | 8/1999 | Gupta |
| 5,955,144 A | 9/1999 | Sinclair et al. |
| 5,964,291 A | 10/1999 | Bourne et al. |
| 5,985,986 A | 11/1999 | Kubitza et al. |
| 6,003,600 A | 12/1999 | Nguyen et al. |
| 6,071,990 A | 6/2000 | Yip et al. |
| 6,079,492 A | 6/2000 | Hoogteijling et al. |
| 6,093,469 A | 7/2000 | Callas |
| 6,093,496 A | 7/2000 | Dominguez et al. |
| 6,114,410 A | 9/2000 | Betzold |
| 6,127,308 A | 10/2000 | Slack et al. |
| 6,187,892 B1 | 2/2001 | Markusch et al. |
| 6,207,766 B1 | 3/2001 | Doi et al. |
| 6,270,692 B1 | 8/2001 | Geissler et al. |
| 6,306,964 B1 | 10/2001 | Evans et al. |
| 6,316,105 B1 | 11/2001 | Khudyakov et al. |
| 6,328,105 B1 | 12/2001 | Betzold |
| 6,372,842 B1 | 4/2002 | Grisso et al. |
| 6,387,501 B1 | 5/2002 | McCrary et al. |
| 6,406,789 B1 | 6/2002 | McDaniel et al. |
| 6,413,647 B1 | 7/2002 | Hayashi et al. |
| 6,439,309 B1 | 8/2002 | Matherly et al. |
| 6,486,287 B2 | 11/2002 | McGall et al. |
| 6,528,157 B1 | 3/2003 | Hussain et al. |
| 6,582,819 B2 | 6/2003 | McDaniel et al. |
| 6,632,527 B1 | 10/2003 | McDaniel et al. |
| 6,668,926 B2 | 12/2003 | Nguyen et al. |
| 6,683,038 B2 | 1/2004 | Forth et al. |
| 6,705,400 B1 | 3/2004 | Nguyen et al. |
| 6,732,800 B2 | 5/2004 | Acock et al. |
| 6,756,124 B2 | 6/2004 | Kanamori et al. |
| 6,767,978 B2 | 7/2004 | Aubart et al. |
| 6,790,245 B2 | 9/2004 | Wolff et al. |
| 6,794,354 B1 | 9/2004 | Mort, III et al. |
| 6,809,149 B2 | 10/2004 | Meyer et al. |
| 6,866,099 B2 | 3/2005 | Nguyen |
| 6,875,728 B2 | 4/2005 | Gupta et al. |
| 6,904,972 B2 | 6/2005 | Zhang et al. |
| 6,906,009 B2 | 6/2005 | Shinbach et al. |
| 6,913,080 B2 | 7/2005 | Lehman et al. |
| 7,012,043 B2 | 3/2006 | Klein et al. |
| 7,074,257 B2 | 7/2006 | Lockwood et al. |
| 7,078,442 B2 | 7/2006 | Brown |
| 7,129,308 B2 | 10/2006 | McGall et al. |
| 7,135,231 B1 | 11/2006 | Sinclair et al. |
| 7,153,575 B2 | 12/2006 | Anderson et al. |
| 7,157,021 B2 | 1/2007 | Bytnar et al. |
| 7,216,711 B2 | 5/2007 | Nguyen et al. |
| 7,244,492 B2 | 7/2007 | Sinclair et al. |
| 7,247,350 B2 | 7/2007 | Sepeur et al. |
| 7,261,156 B2 | 8/2007 | Nguyen et al. |
| 7,270,879 B2 | 9/2007 | McCrary |
| 7,281,580 B2 | 10/2007 | Parker et al. |
| 7,281,581 B2 | 10/2007 | Nguyen et al. |
| 7,318,472 B2 | 1/2008 | Smith |
| 7,318,474 B2 | 1/2008 | Welton et al. |
| 7,322,411 B2 | 1/2008 | Brannon et al. |
| 7,326,346 B2 | 2/2008 | Lovell et al. |
| 7,332,089 B2 | 2/2008 | Harjula et al. |
| 7,334,635 B2 | 2/2008 | Nguyen |
| 7,334,783 B2 | 2/2008 | Yoneyama et al. |
| 7,343,973 B2 | 3/2008 | Dusterhoft et al. |
| 7,344,783 B2 | 3/2008 | Shea |
| 7,350,571 B2 | 4/2008 | Nguyen et al. |
| 7,399,715 B2 | 7/2008 | Tsuchiya et al. |
| 7,407,010 B2 | 8/2008 | Rickman et al. |
| 7,528,096 B2 | 5/2009 | Brannon et al. |
| 7,537,702 B2 | 5/2009 | Lupton et al. |
| 7,541,318 B2 | 6/2009 | Weaver et al. |
| 7,624,802 B2 | 12/2009 | McCrary et al. |
| 7,678,872 B2 | 3/2010 | Glass et al. |
| 7,721,804 B2 | 5/2010 | Duenckel |
| 7,726,399 B2 | 6/2010 | Brannon et al. |
| 7,754,659 B2 | 7/2010 | Rediger et al. |
| 7,772,163 B1 | 8/2010 | Brannon et al. |
| 7,789,147 B2 | 9/2010 | Brannon et al. |
| 7,803,742 B2 | 9/2010 | Bicerano et al. |
| 7,884,043 B2 | 2/2011 | Lisetskiy et al. |
| 7,896,080 B1 | 3/2011 | Watters et al. |
| 7,906,474 B2 | 3/2011 | Varineau et al. |
| 7,919,183 B2 | 4/2011 | McDaniel et al. |
| 7,921,910 B2 | 4/2011 | Wilson et al. |
| 7,932,295 B2 | 4/2011 | Tsuchiya et al. |
| 7,999,013 B2 | 8/2011 | Brown |
| 8,006,754 B2 | 8/2011 | Bicerano |
| 8,006,755 B2 | 8/2011 | Bicerano |
| 8,052,890 B2 | 11/2011 | Nguyen |
| 8,133,587 B2 | 3/2012 | Rediger et al. |
| 8,183,179 B2 | 5/2012 | Garcia-Lopez De Victoria et al. |
| 8,236,738 B2 | 8/2012 | Zhang |
| 8,258,206 B2 | 9/2012 | Kanagasabapathy et al. |
| 8,298,667 B2 | 10/2012 | Smith et al. |
| 8,338,351 B2 | 12/2012 | Kanagasabapathy et al. |
| 8,349,911 B2 | 1/2013 | Kuehnle |
| 8,354,279 B2 | 1/2013 | Nguyen et al. |
| 8,360,149 B2 | 1/2013 | Hughes et al. |
| 8,431,220 B2 | 4/2013 | Wu et al. |
| 8,506,216 B2 | 8/2013 | Hiroshima et al. |
| 8,513,342 B2 | 8/2013 | Gao et al. |

(56) References Cited

U.S. PATENT DOCUMENTS

| | | |
|---|---|---|
| 8,524,441 B2 | 9/2013 | Zhang et al. |
| 8,592,015 B2 | 11/2013 | Bicker et al. |
| 8,604,132 B2 | 12/2013 | Jakubowski et al. |
| 8,664,151 B2 | 3/2014 | Haeberle et al. |
| 8,686,081 B2 | 4/2014 | Eichman et al. |
| 8,763,700 B2 | 7/2014 | McDaniel et al. |
| 8,778,495 B2 | 7/2014 | Rediger et al. |
| 8,785,356 B2 | 7/2014 | Plotnikov et al. |
| 8,796,188 B2 | 8/2014 | Pisklak et al. |
| 8,800,658 B2 | 8/2014 | Zhang |
| 8,826,083 B2 | 9/2014 | Yamasaki et al. |
| 8,936,083 B2 | 1/2015 | Nguyen |
| 8,993,489 B2 | 3/2015 | McDaniel et al. |
| 9,040,467 B2 | 5/2015 | McDaniel et al. |
| 9,097,996 B2 | 8/2015 | Hille |
| 9,150,713 B2 | 10/2015 | Bilodeau et al. |
| 9,290,690 B2 | 3/2016 | McDaniel et al. |
| 9,315,721 B2 | 4/2016 | Mahoney et al. |
| 9,487,692 B2 | 11/2016 | Nguyen et al. |
| 9,518,214 B2 | 12/2016 | McCrary et al. |
| 9,523,030 B2 | 12/2016 | Zhang |
| 9,562,187 B2 | 2/2017 | McCrary et al. |
| 9,624,421 B2 | 4/2017 | McDaniel et al. |
| 9,725,645 B2 | 8/2017 | Monastiriotis et al. |
| 9,790,422 B2 | 10/2017 | McDaniel |
| 9,862,881 B2 | 1/2018 | Drake et al. |
| 10,087,360 B2 | 10/2018 | McDaniel et al. |
| 10,100,247 B2 * | 10/2018 | Monastiriotis ........... C09K 8/68 |
| 10,208,242 B2 | 2/2019 | McCrary et al. |
| 10,544,358 B2 | 1/2020 | McDaniel et al. |
| 2001/0014453 A1 | 8/2001 | McGall et al. |
| 2002/0048676 A1 | 4/2002 | McDaniel et al. |
| 2003/0102128 A1 | 6/2003 | Dawson et al. |
| 2003/0131998 A1 | 7/2003 | Nguyen et al. |
| 2003/0168217 A1 | 9/2003 | Zhang et al. |
| 2003/0196805 A1 | 10/2003 | Boney |
| 2003/0224165 A1 | 12/2003 | Anderson et al. |
| 2004/0010267 A1 | 1/2004 | Nakamura et al. |
| 2004/0023818 A1 | 2/2004 | Nguyen et al. |
| 2004/0129923 A1 | 7/2004 | Nguyen et al. |
| 2004/0138343 A1 | 7/2004 | Campbell et al. |
| 2004/0211561 A1 | 10/2004 | Nguyen et al. |
| 2004/0244978 A1 | 12/2004 | Shaarpour |
| 2005/0018193 A1 | 1/2005 | Chilese et al. |
| 2005/0019574 A1 | 1/2005 | McCrary |
| 2005/0028979 A1 | 2/2005 | Brannon et al. |
| 2005/0034861 A1 | 2/2005 | Saini et al. |
| 2005/0173116 A1 | 8/2005 | Nguyen et al. |
| 2005/0244641 A1 | 11/2005 | Vincent |
| 2005/0244658 A1 | 11/2005 | Bae et al. |
| 2005/0274523 A1 | 12/2005 | Brannon et al. |
| 2006/0035790 A1 | 2/2006 | Okell et al. |
| 2006/0073980 A1 | 4/2006 | Brannon et al. |
| 2006/0118300 A1 | 6/2006 | Welton et al. |
| 2006/0157243 A1 | 7/2006 | Nguyen |
| 2006/0241198 A1 | 10/2006 | Motz et al. |
| 2006/0243441 A1 | 11/2006 | Cornelius de Grood et al. |
| 2006/0260808 A1 | 11/2006 | Weaver et al. |
| 2006/0283599 A1 | 12/2006 | Nguyen et al. |
| 2006/0292345 A1 | 12/2006 | Dave et al. |
| 2007/0021309 A1 | 1/2007 | Bicerano |
| 2007/0034373 A1 | 2/2007 | McDaniel et al. |
| 2007/0036977 A1 | 2/2007 | Sinclair et al. |
| 2007/0066742 A1 | 3/2007 | Mhetar et al. |
| 2007/0073590 A1 | 3/2007 | Cosentino et al. |
| 2007/0079965 A1 | 4/2007 | Nguyen et al. |
| 2007/0088137 A1 | 4/2007 | Georgeau et al. |
| 2007/0161515 A1 | 7/2007 | Bicerano |
| 2007/0204992 A1 | 9/2007 | Davis et al. |
| 2007/0207186 A1 | 9/2007 | Scanlon et al. |
| 2007/0208156 A1 | 9/2007 | Posey et al. |
| 2007/0209794 A1 | 9/2007 | Kaufman et al. |
| 2007/0215354 A1 | 9/2007 | Rickman et al. |
| 2007/0228322 A1 | 10/2007 | Chaves et al. |
| 2007/0289781 A1 | 12/2007 | Rickman et al. |
| 2008/0011478 A1 | 1/2008 | Welton et al. |
| 2008/0063868 A1 | 3/2008 | Chung et al. |
| 2008/0087429 A1 | 4/2008 | Brannon et al. |
| 2008/0161212 A1 | 7/2008 | Welton et al. |
| 2008/0202744 A1 | 8/2008 | Crews et al. |
| 2008/0202750 A1 | 8/2008 | Rediger et al. |
| 2008/0226704 A1 | 9/2008 | Kigoshi et al. |
| 2008/0230223 A1 | 9/2008 | McCrary et al. |
| 2008/0236825 A1 | 10/2008 | Barmatov et al. |
| 2008/0318812 A1 | 12/2008 | Kakadjian, Sr. et al. |
| 2009/0029097 A1 | 1/2009 | Riddle et al. |
| 2009/0044942 A1 | 2/2009 | Gupta |
| 2009/0107673 A1 | 4/2009 | Huang et al. |
| 2009/0176667 A1 | 7/2009 | Nguyen |
| 2009/0238988 A1 | 9/2009 | McDaniel et al. |
| 2010/0028542 A1 | 2/2010 | Reese et al. |
| 2010/0065271 A1 | 3/2010 | McCrary et al. |
| 2010/0105817 A1 | 4/2010 | Arkles et al. |
| 2010/0132943 A1 | 6/2010 | Nguyen et al. |
| 2010/0147507 A1 | 6/2010 | Korte et al. |
| 2010/0196621 A1 | 8/2010 | Larson-Smith et al. |
| 2010/0212898 A1 | 8/2010 | Nguyen et al. |
| 2010/0282462 A1 | 11/2010 | Xu et al. |
| 2010/0286000 A1 | 11/2010 | Huang et al. |
| 2011/0016837 A1 | 1/2011 | Fischer et al. |
| 2011/0024129 A1 | 2/2011 | Turakhia et al. |
| 2011/0053809 A1 | 3/2011 | Sanders et al. |
| 2011/0098492 A1 | 4/2011 | Varineau et al. |
| 2011/0104371 A1 | 5/2011 | Mizwicki et al. |
| 2011/0120719 A1 | 5/2011 | Soane et al. |
| 2011/0160097 A1 | 6/2011 | Mirzaei et al. |
| 2011/0162837 A1 | 7/2011 | O'Malley et al. |
| 2011/0230612 A1 | 9/2011 | Eldredge et al. |
| 2011/0244125 A1 | 10/2011 | Weisenberg et al. |
| 2011/0272146 A1 | 11/2011 | Green et al. |
| 2011/0297383 A1 | 12/2011 | Tanguay et al. |
| 2012/0018162 A1 | 1/2012 | Tanguay et al. |
| 2012/0040194 A1 | 2/2012 | Kanai et al. |
| 2012/0122363 A1 | 5/2012 | Owens |
| 2012/0267105 A1 | 10/2012 | Zhang |
| 2012/0267112 A1 | 10/2012 | Zhang et al. |
| 2012/0277130 A1 | 11/2012 | Usova |
| 2012/0279703 A1 | 11/2012 | McDaniel et al. |
| 2012/0280419 A1 | 11/2012 | Martin et al. |
| 2012/0283153 A1 | 11/2012 | McDaniel et al. |
| 2012/0283155 A1 | 11/2012 | Huang et al. |
| 2012/0295114 A1 | 11/2012 | Rediger et al. |
| 2012/0318514 A1 | 12/2012 | Mesher |
| 2012/0322925 A1 | 12/2012 | Arigo et al. |
| 2013/0005856 A1 | 1/2013 | Phonthammachai et al. |
| 2013/0037048 A1 | 2/2013 | Edgington et al. |
| 2013/0045901 A1 | 2/2013 | Bicerano |
| 2013/0048365 A1 | 2/2013 | Kim et al. |
| 2013/0065800 A1 | 3/2013 | McDaniel et al. |
| 2013/0081812 A1 | 4/2013 | Green et al. |
| 2013/0095276 A1 | 4/2013 | Dave et al. |
| 2013/0164449 A1 | 6/2013 | Tadepalli et al. |
| 2013/0178568 A1 | 7/2013 | Meuler et al. |
| 2013/0184381 A1 | 7/2013 | Bilodeau et al. |
| 2013/0186624 A1 | 7/2013 | McCrary et al. |
| 2013/0203917 A1 | 8/2013 | Harris et al. |
| 2013/0233545 A1 | 9/2013 | Mahoney et al. |
| 2013/0312974 A1 | 11/2013 | McClung, IV |
| 2014/0060826 A1 | 3/2014 | Nguyen |
| 2014/0060831 A1 | 3/2014 | Miller |
| 2014/0060832 A1 | 3/2014 | Mahoney et al. |
| 2014/0116698 A1 | 5/2014 | Tang et al. |
| 2014/0144631 A1 * | 5/2014 | Weaver ................. E21B 43/267 166/280.2 |
| 2014/0162911 A1 | 6/2014 | Monastiriotis et al. |
| 2014/0262247 A1 | 9/2014 | Duenckel et al. |
| 2014/0274819 A1 | 9/2014 | McCrary et al. |
| 2014/0305650 A1 | 10/2014 | Song et al. |
| 2014/0338906 A1 | 11/2014 | Monastiriotis et al. |
| 2015/0034314 A1 | 2/2015 | Hudson et al. |
| 2015/0119301 A1 | 4/2015 | McDaniel et al. |
| 2015/0175750 A1 | 6/2015 | Hopkins et al. |
| 2015/0196940 A1 | 7/2015 | Aizenberg et al. |
| 2015/0203745 A1 | 7/2015 | McDaniel et al. |

(56) References Cited

U.S. PATENT DOCUMENTS

| | | |
|---|---|---|
| 2015/0259592 A1 | 9/2015 | McDaniel et al. |
| 2015/0315459 A1 | 11/2015 | McDaniel et al. |
| 2015/0322335 A1 | 11/2015 | Lawrence |
| 2016/0137904 A1 | 5/2016 | Drake et al. |
| 2016/0177129 A1 | 6/2016 | McCarthy et al. |
| 2016/0194556 A1 | 7/2016 | McDaniel et al. |
| 2016/0215208 A1 | 7/2016 | Monastiriotis et al. |
| 2016/0251803 A1 | 9/2016 | Tuteja et al. |
| 2016/0333258 A1 | 11/2016 | Drake et al. |
| 2016/0333259 A1 | 11/2016 | Monastiriotis et al. |
| 2016/0333260 A1 | 11/2016 | Drake et al. |
| 2016/0376496 A1 | 12/2016 | Gershanovich et al. |
| 2017/0015835 A1 | 1/2017 | Aizenberg et al. |
| 2017/0015892 A1 | 1/2017 | Nguyen et al. |
| 2018/0119005 A1 | 5/2018 | Drake et al. |
| 2018/0134946 A1 | 5/2018 | McDaniel |
| 2018/0134949 A1 | 5/2018 | Monastiriotis et al. |
| 2018/0148636 A1 | 5/2018 | Monastiriotis et al. |
| 2018/0230363 A1 | 8/2018 | McDaniel |
| 2019/0126314 A1 | 5/2019 | Monastiriotis et al. |
| 2019/0249077 A1 | 8/2019 | Monastiriotis et al. |
| 2019/0249078 A1 | 8/2019 | McDaniel et al. |

FOREIGN PATENT DOCUMENTS

| | | | |
|---|---|---|---|
| CA | 2163972 C | 5/2007 | |
| CA | 2574808 C | 12/2010 | |
| CA | 2858920 A1 | 6/2013 | |
| CN | 1149007 A | 5/1997 | |
| CN | 101641211 A | 2/2010 | |
| CN | 102203211 B | 12/2013 | |
| CN | 103889706 A | 6/2014 | |
| DE | 102010051817 A1 | 5/2012 | |
| EP | 0207668 A1 | 1/1987 | |
| EP | 0544303 A3 | 9/1993 | |
| EP | 0690073 A1 | 1/1996 | |
| EP | 2440630 A1 | 4/2012 | |
| EP | 2469020 A1 | 6/2012 | |
| GB | 1294017 A | 10/1972 | |
| MX | 2013012807 A | 8/2014 | |
| WO | 2001033039 A1 | 5/2001 | |
| WO | 2005075551 A1 | 8/2005 | |
| WO | 2005121272 A1 | 12/2005 | |
| WO | 2010049467 A1 | 5/2010 | |
| WO | 2013048365 A1 | 4/2013 | |
| WO | 2013112251 A1 | 8/2013 | |
| WO | 2013158306 A1 | 10/2013 | |
| WO | WO-2014052459 A1 * | 4/2014 | ............ B05D 3/007 |
| WO | 2014144464 A2 | 9/2014 | |
| WO | 2015066283 A1 | 5/2015 | |
| WO | 2015073292 A1 | 5/2015 | |
| WO | 2016144361 A1 | 9/2016 | |
| WO | 2016176350 A1 | 11/2016 | |
| WO | 2016183322 A1 | 11/2016 | |

OTHER PUBLICATIONS

Non-final Office Action dated Apr. 29, 2020 in U.S. Appl. No. 15/810,533.
Non-Final Office Action dated Feb. 4, 2019 in U.S. Appl. No. 15/070,819.
Non-Final Office Action dated Jan. 6, 2021 issued in U.S. Appl. No. 15/572,877.
Non-final Office Action dated Jul. 18, 2019 in U.S. Appl. No. 15/572,877.
Non-Final Office Action dated Jun. 25, 2021 issued in U.S. Appl. No. 15/572,877.
Non-Final Office Action dated Mar. 19, 2020 in U.S. Appl. No. 15/837,370.
Non-final Office Action dated Sep. 13, 2018 in U.S. Appl. No. 14/673,340.
Non-Final Office Action, dated Dec. 7, 2021, issued in U.S. Appl. No. 16/178,684.
Non-Final Office Action, dated Jan. 6, 2021, issued in U.S. Appl. No. 15/810,533.
Non-Final Office Action, dated Mar. 16, 2021, issued in U.S. Appl. No. 16/130,290.
Non-Final Office Action, dated Nov. 22, 2021, issued in U.S. Appl. No. 16/713,436.
Non-Final Office Action, dated Nov. 23, 2020, issued in U.S. Appl. No. 16/178,684.
Nonfinal Office Action dated Jun. 21, 2018 received in U.S. Appl. No. 15/153,099.
Nonfinal Office Action dated Oct. 4, 2017 received in U.S. Appl. No. 13/897,288.
Nonfinal Office Action dated Mar. 16, 2018 in U.S. Appl. No. 14/713,236.
Notice of Alllowance, dated Aug. 18, 2021, issued in U.S. Appl. No. 15/810,533.
Notice of Allowance dated Dec. 22, 2015 in U.S. Appl. No. 13/626,055.
Notice of Allowance dated Aug. 8, 2016 in U.S. Appl. No. 13/837,396.
Notice of Allowance dated Oct. 31, 2016 in U.S. Appl. No. 13/355,969.
Notice of Allowance dated Nov. 9, 2016 in U.S. Appl. No. 14/015,629.
Notice of Allowance dated Dec. 8, 2016 in U.S. Appl. No. 14/314,573.
Notice of Allowance dated Jun. 12, 2017 in U.S. Appl. No. 14/266,179.
Notice of Allowance dated Sep. 12, 2017 in U.S. Appl. No. 15/073,840.
Notice of Allowance dated Sep. 12, 2019 in U.S. Appl. No. 15/070,819.
Notice of Allowance dated Aug. 6, 2018 in U.S. Appl. No. 13/897,288.
Notice of Allowance dated Dec. 18, 2019 in U.S. Appl. No. 15/153,099.
Notice of Allowance dated Feb. 24, 2020 in U.S. Appl. No. 15/823,699.
Notice of Allowance dated May 17, 2018 in U.S. Appl. No. 15/461,694.
Notice of Allowance, dated May 24, 2021, issued in U.S. Appl. No. 16/124,742.
Office Action dated Jun. 6, 2017 in U.S. Appl. No. 14/528,070.
Official Action dated Nov. 30, 2015 from U.S. Appl. No. 14/798,774.
Polyurethanes, Ullmann's Encyclopedia of Industrial Chemistry, 2012, vol. 29.
Ramirez et al., Synthesis of crosslinked and functionalized polystyrene by miniemulsion polymerization: particle size control, Macromex 2014.
Samuel et al., Gelled Oil: new chemistry using surfactants, SPE International 2005 SPE 97545.
Sanchez, Mariano, FRAC Packing: Fracturing for Sand Control, Middle East and Asia Reservoir Review, Nov. 8, 2007, pp. 37-49.
Sigma-Aldrich, "Polybutadiene, hydroxyl terminated" Jun. 8, 2014, https://web.archive.org/web/20140608155646/http:product/alddrich/190799?lang=en&region=).
Tambodi et al. "Crosslinked polyethylene", Indian J. Chem. Technol., (2004) vol. 11, pp. 853-864.
The removal of heavy metals cations by natural zeolites; retrieved from the internet http://www.resultsrna.com/research/zeolite_binds_heavy_metals.php; Aug. 31, 2011.
Weaver et al., Sustaining Conductivity, Society of Petroleum Engineers 2006 SPE98236.
Wikipedia, ion-exchange resin, en.wikipedia.org/wikiIon_exchange_resins, pp. 1-5.
Wikipedia, Methylene diphenyl diisocyanate, retrieved from the internet http://en.wikipedia.org/wiki/Methylene_diphenyl_diisocyanate; Jul. 21, 2011.
Wikipedia, Piezoelectricity, en.wikipedia.org.wiki/Piezoelectricity, pp. 1-15.
Wingenfelder et al., Removal of heavy metals from mine waters by natural zeolites, Environ Sci Technol, 2005, 39:4606-4613.
AkzoNobel Declaration of Compliance Bindzil CC401, Eka Chemical, Jan. 27, 2010, pp. 1-4.
AkzoNobel Silane Modified Colloidal Silca Bindzil CC in Waterborne Coating Applications Use and Benefits, 2011, pp. 1-6.

(56) References Cited

OTHER PUBLICATIONS

Boster, Ronald S., A Study of Ground-Water Contamination Due to Oil-Field Brines in Morrow and Delaware; Counties, Ohio, With Emphasis on Detection Utilizing Electrical Resistivity Techniques, The Ohio State University,; 1967.
Cao et al., Mesoporous SiO2-supported Pt Nanoparticles for catalytic application, ISRN Nanomaterials, 2013, Article ID 745397, 7 pages.
CARBO Ceramics, Topical Reference, Physical Properites of Proppants, 2011, pp. 1-5.
Chemicalland21, "Lauryl alcohol ethoxylates" Mar. 18, 2006, https://web.archive.org/web/20060318023334/http://www.chemicalland21.com/specialtychem/perchem/LAURYL%20ALCOHOL%20ETHOXYLATE.htm.
Dewprashad et al., Modifying the proppant surface to enhance fracture condictivity, Society of Petroleum Engineers 1999 SPE50733.
EPA, Oil and Gas Extraction, Compliance and Enforcement History, Sector Notebook Project, Oct. 2000, pp. 115-155.
Final Office Action dated Mar. 15, 2018 in U.S. Appl. No. 14/798,774.
Final Office Action dated Jul. 10, 2019 in U.S. Appl. No. 15/823,699.
Final Office Action dated Jan. 18, 2018 in U.S. Appl. No. 14/528,070.
Final Office Action dated Apr. 29, 2016 in U.S. Appl. No. 14/798,774.
Final Office Action dated May 3, 2016 in U.S. Appl. No. 14/266,179.
Final Office Action dated May 27, 2016 in U.S. Appl. No. 13/837,396.
Final Office Action dated Jan. 4, 2017 in U.S. Appl. No. 13/897,288.
Final Office Action dated Jun. 26, 2017 in U.S. Appl. No. 14/673,340.
Final Office Action dated Oct. 24, 2017 U.S. Appl. No. 15/461,694.
Final Office Action dated Jul. 6, 2018 in U.S. Appl. No. 15/070,819.
Final Office Action dated Apr. 12, 2019 in U.S. Appl. No. 14/673,340.
Final Office Action dated Feb. 24, 2020 in U.S. Appl. No. 15/572,877.
Final Office Action dated Jul. 6, 2021 issued in U.S. Appl. No. 16/906,020.
Final Office Action dated Mar. 19, 2019 in U.S. Appl. No. 15/153,099.
Final Office Action, dated Aug. 2, 2021, issued in U.S. Appl. No. 16/130,290.
Final Office Action, dated Jan. 1, 2021, issued in U.S. Appl. No. 16/124,742.
Final Office Action, dated Jun. 1, 2021, issued in U.S. Appl. No. 16/178,684.
Halimoon, Removal of heavy metals from textile wastewater using zeolite, Environment Asia, 2010, 3(special issue):124-130.
Hui et al., Removal of mixed heavy metal ions in wasterwater by zeolite 4A and residual products from recycled coal fly ash, Jounal of Hazardous Materials, Aug. 1, 2005, vol. B124, pp. 89-101.
Huntsman, JEFFCAT Amine Catalysts for the Polyurethane Industry, Americas Region, 2010, pp. 1-4.
Huntsman, Performance Products, JEFFCAT catalysts for the polyurethane industry, Asia Pacific, 2010, pp. 1-6.
Huntsman, The JEFFAMINE Polyetheramines, 2007.
International Search Report and Written Opinion issued in PCT/US2012/036093 dated Aug. 14, 2012.
International Search Report and Written Opinion issued in PCT/US2012/047519 dated Nov. 2, 2012.
International Search Report and Written Opinion issued in PCT/US2012/053277 dated Nov. 20, 2012.
International Search Report issued in PCT/US2012/070844 dated Mar. 8, 2013.
Interstate Oil and Gas Compact Commission and ALL Consulting, a Guide to Practical Management of Produced; Water from Onshore Oil and Gas Operations in the United States, Oct. 2006.
Kuang et al., Controllable fabrication of SnO2-coated multiwalled carbon nanotubes by chemical vapor deposition, Carbon 2006 44(7):1166-1172.
Madaan and Tyagi, Quaternary pryidinium salts: a review, J Oleo Sci 2008 57(4):197-215.
Mellaerts et al., Enhanced release of itraconazole from ordered mesoporous SBA-15 silica materials, Chem Commun 2007 7(13):1375-7.
Momentive Safety Data Sheet, 2015.
Momentive Technical Data Sheet, Revised 2019.
Non-final Office Action dated Jun. 26, 2018 in U.S. Appl. No. 15/709,781.
Non-Final Office Action dated Mar. 18, 2016 in U.S. Appl. No. 13/355,969.
Non-Final Office Action dated Apr. 5, 2016 in U.S. Appl. No. 13/897,288.
Non-Final Office Action dated Apr. 5, 2016 in U.S. Appl. No. 14/314,573.
Non-Final Office Action dated Aug. 25, 2016 in U.S. Appl. No. 15/073,840.
Non-final Office Action dated Dec. 6, 2016 in U.S. Appl. No. 14/673,340.
Non-final Office Action dated Feb. 17, 2017 in U.S. Appl. No. 14/713,235.
Non-final Office Action dated Apr. 27, 2017 in U.S. Appl. No. 15/073,840.
Non-final Office Action dated Jul. 12, 2017 in U.S. Appl. No. 14/798,774.
Non-final Office Action dated Aug. 29, 2017 in U.S. Appl. No. 15/003,118.

* cited by examiner

PROPPANT WITH ENHANCED INTERPARTICLE BONDING

CROSS REFERENCE TO RELATED APPLICATIONS

This application is a continuation of U.S. patent application Ser. No. 16/124,742, filed Sep. 7, 2018, now U.S. Pat. No. 11,098,242, which is a continuation of U.S. patent application Ser. No. 13/897,288, filed May 17, 2013, now U.S. Pat. No. 10,100,247, each of which is hereby incorporated by reference in its entirety.

FIELD OF INVENTION

The invention relates to a composition and method for the production of proppants having an outer coating that promotes interparticle bonding.

BACKGROUND OF THE INVENTION

Coated proppants are often used in hydraulic well fracturing to increase production rate of the well. The commercial "standard" coatings are typically a form of phenolic thermoset coating. Partially cured phenolic proppants are typically used in low temperature wells (i.e., those having bottom hole temperature of less than about 150° F. (66° C.)) which typically exhibit low crack closure stresses (e.g., 2000-6000 psi). The theory behind their use is that the residual reactivity of the partially cured phenolic coating in conjunction with a surfactant activator (which acts like a plasticizer) and the existence of water found in most wells will permit the coating to soften and flow, thereby allowing the proppants to consolidate and form interparticle bonds during the "shut-in" period. The formation temperature of the downhole conditions is supposed to complete the curing reactions in situ in the propped formation. An external activator fluid is used to soften the outer surface of these partially cured coated proppants in an effort to encourage consolidation and interparticle bonding. The activator itself raises, however, additional issues of compatibility with the fracturing and breaker fluids as well as the possibility of adverse effects on the continued conductivity of the proppant packed fractured strata.

For high temperature wells, such as those with a bottom hole temperature above about 200° F. (93° C.), both partially cured phenolic coated proppants (with an activator) or precured phenolic coatings are often used. In the case of the precured coated proppant, the fracture/crack closure stresses are often above 6,000 psi are used as the main mechanism for holding proppant within the cracked strata.

In practice, however, a variety of factors can adversely affect the performance and usefulness of the partially cured, phenolic coatings. The most important of these is premature curing of the partially cured phenolic resin in the coating due to exposure to high temperatures before introduction into the fractured strata. Even the elevated, above-ground, temperatures found on loading docks and in shipping containers can be enough to effect curing of the coating long before it is desirable. This is particularly an issue that comes into play when using partially-cured phenolic coatings in deep high temperature wells. In low temperature applications, the partially cured phenolic coatings simply take too long to cure to create bond strength. Bond strength can be developed in a reasonable time frame if the activator is used in conjunction with the partially-cured, coated proppant. However, using the activator requires the addition to be metered into the fracturing fluid in a controlled manner at the right time. This increases the complexity of the fracturing treatment. Even if the activator is added at the proper concentration and time, there still remain the issues with fracturing fluid compatibility and the aforementioned reduced fracture conductivity.

Two published patent applications discuss the use of isocyanates for proppant coatings. Tanguay et al. 2011/0297383 presents examples of high temperature proppant coatings made of a polycarbodiimide coating on sand. The coating is said to be made from the reaction of a monomeric isocyanate and a polymeric isocyanate. The catalyst is a phosphorous-based catalyst exemplified in example 1 by 3-methyl-1-phenyl-2-phospholene oxide.

Tanguay et al. 2012/0018162 relates to a polyamide imide proppant coating for high temperature applications. The examples have a description of the use of polymeric diphenylmethane diisocyanate, trimellitic anhydride, one of three different types of amines, triethylamine as a catalyst, an adhesion promoter and a wetting agent. The coating/reaction process described lasts about 10 minutes followed by a post-cure heating of 1-3 hours.

Recently, it has been discovered that cured, commercially acceptable, coatings can be applied to proppants using the polyurethane or polyurea reaction products of polyols and isocyanates. The details of these processes are disclosed in co-pending U.S. patent application Ser. No. 13/099,893 (entitled "Coated and Cured Proppants"); Ser. No. 13/188,530 (entitled "Coated and Cured Proppants"); Ser. No. 13/626,055 (entitled "Coated and Cured Proppants"); Ser. No. 13/224,726 (entitled "Dual Function Proppants"); Ser. No. 13/355,969 (entitled "Manufacture of Polymer Coated Proppants"); and Ser. No. 13/837,396 (entitled "Proppant With Polyurea-Type Coating"), the disclosures of which are herein incorporated by reference. Commercially available proppants that use such coatings are available under the designations PEARL and GARNET from Preferred Sands, Inc. Such polyurethane and polyurea-based proppant coatings are economically and environmentally desirable for a number of reasons. Importantly, each acts like a fully cured coating for purposes of handling, shipping and introduction into a fractured field yet exhibit the inherent ability to form interparticle bonds under downhole temperatures and pressures for enhanced conductivity and proppant flowback control.

Despite the benefits found by the interparticle bonding seen in recent proppant coatings, there exists a continuing need in the industry for a proppant coating that will controllably form interparticle bond strength at a wide variety of the expected downhole temperature and pressure conditions yet will not be compromised in forming such interparticle bond strength by premature exposure to elevated or high temperatures.

SUMMARY OF THE INVENTION

The present invention provides a polymer-coated proppant having an outer layer portion that comprises an organofunctional coupling agent, preferably an organofunctional silane coupling agent. The use of an organofunctional coupling agent in the outer layer portion of the proppant coating is preferably chosen to be reactive towards the polymer of the coating so that, when introduced downhole, the outer layer of the proppants are mutually reactive and form enhanced interparticle bonding at the temperatures and crack closure pressures found downhole in fractured strata. Such enhanced interparticle bonding helps keep the proppant in the fracture and maintains conductivity with reduced flowback.

The coupling agent-enhanced proppant coating of the present invention allows low temperature coatings to be much more effective in low temperature wells by increasing the exhibited interparticle bond strength reflected by conventional UCS tests. It also allows high temperature coatings to become useful for low and medium temperature wells by exhibiting interparticle bond strength that was not previously exhibited or only marginally exhibited.

DETAILED DESCRIPTION OF THE INVENTION

The present invention relates to a proppant coating that includes at least an outer layer portion that comprises an organic polymer coating and a coupling agent. An inner layer portion that is immediately adjacent the core solid may be the made from the same polymer or a different polymer or resin. The inner and outer layer portions may be formed in one substantially continuous coating process (e.g., forming a single type of polymeric coating or with changing proportions or ingredients to form two different layer portions or polymers) or in sequential coating processes (e.g., coating a cured or curable phenolic resin-coated proppant with a polyurethane or polyurea-based polymer to add enhanced interparticle bonding). Preferably, a coupling agent is added during the later stages of a single, substantially continuous coating operation that forms one type of polymeric proppant coating having an inner portion that is immediately adjacent the core solid and an outer layer portion that provides silane functionalities that are available for bonding with other, similarly coated proppants to form a mass of proppants that exhibiting a bond strength in a conventional UCS test. Even more preferably, the silane coupling agent is added at an early stage of the coating operation to help bond the coating to the proppant core and again later in the coating process to form an outer layer that will provide enhanced interparticle bonding. It is also possible, however, to use one type of coupling agent for enhancing the bond between the proppant core solid and any applied coating and a second, different type of coupling agent that is compatible with the polymer coating for enhancing bond strength between adjacent proppants lodged within cracks of a fractured field.

Silanes usually have four main functions:
1. Crosslinking: Once attached to a polymer backbone, silanes can link polymer molecules together via the formation of siloxane bonds, creating a three-dimensional network. This "crosslinking" is activated by ambient moisture and can take place at ambient temperature. Silanes can provide improved thermal stability, creep resistance, hardness and chemical resistance to coatings, adhesives and sealants.
2. Adhesion Promotion: Silanes can provide improved substrate adhesion in adhesives, sealants and coatings, especially under hot and humid conditions. Silanes are commonly used to improve adhesion to glass and metals, but they can also be beneficial with difficult substrates like polyamide, SMC, acrylics, PVC and others.
3. Coupling: Silanes can couple inorganic pigments and fillers to organic resins. Coupling typically improves the moisture and chemical resistance of the coating or adhesive.
4. Dispersion: Silanes can aid in the dispersion of inorganic pigments and fillers in coatings and sealants. This can lead to lower viscosity in the formulated product and can improve the hiding power of a coating.

In the present invention, a coupling agent is added to the outer portion of an outer coating layer of the overall proppant coating to provide exposed coupling agent functionalities that will bond with exposed coupling agent functionalities on adjacent proppants to enhance interparticle bonding between these adjacent, coated proppants under downhole temperatures and crack closure stresses. Preferably, organofunctional silanes are used that are compatible with, or reactive towards, the polymer or polymers used as the outer coating layer of the proppant. The organofunctional silanes are incorporated in a skin formation within the outer layers of the coating, in a targeted fashion. The alkoxysilane's functionality (organic reactivity) is designed to match the polymer system and optimize the reaction (grafting) with it, while exposing the alkoxy groups on the outer layers, and therefore on the solid-air interface, which will increase tackiness and crosslinking/bonding at the particle-to-particle contact point in presence of water found downhole in fractured strata.

Organofunctional silanes are bi-functional molecules in that they usually have two types of reactivity built into their structures—organic and inorganic. The organofunctional silanes that are useful in the present invention can exhibit any number of possible functionalities-discrete moieties to polymers—provided that the added functionalities are compatible with the polymer and/or polymeric components of the proppant coating. For example, preferred organic functionalities are compatible with the polyol component if the proppant coating is a polyurethane polymer.

One type of organofunctional silane that is useful in the present invention can be represented by Formula 1 below which shows the common elements of a typical organofunctional silane.

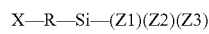   Formula 1

Wherein:
X=a reactive organic group
R=a linking group
Z1, Z2 and Z3=hydrolyzable groups (Let me know if you want to add silicates. I do not think they are coupling agents. If you believe otherwise, let's discuss.)

The organic end (X) is designed for reactivity with an organic resin. Reactive organic groups that are available include primary and substituted amino, epoxy, methacryl, vinyl, mercapto, urea and isocyanate. The organic group is selected either to react with or co-polymerize into a resin or to take part in the cure reaction of the resin system.

Between the organic group and the silicon atom is a linking group, commonly, a "trimethylene chain." The silicon-carbon bond of the linking group is stable to most environmental conditions. The inorganic end of the molecule reacts through hydrolyzable groups attached to silicon (Z1, Z2, Z3). The hydrolyzable groups are usually alkoxy groups such as methoxy, ethoxy or isopropoxy. Each hydrolyzes at a different rate and releases a different alcohol upon reaction with ambient moisture. In some cases, only two hydrolyzable groups are present, although a three-group configuration is more convenient synthetically and usually gives more moisture-resistant bonds. Most coupling agents have only one silicon atom, but some silanes are available with multiple silicons.

A preferred silane that is usable as a coupling agent can be an organosilicon, which can be derived from an organic silane having the chemical structure of Formula 2

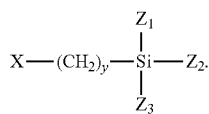

Formula 2

Within the chemical structure of Formula 2, the X can be a functional group selected from the group consisting of: hydrogen, an amino group, a polyamino alkyl group, a mercapto group, a thiocyanato group, an epoxy group, a vinyl group, a halogen, an acryloxy group, and a methacryloxy group. Within the chemical structure, the Y can be an integer equal to or greater than 0. Within the chemical structure, the $Z_1$, $Z_2$, and $Z_3$ can each be independently selected from the group consisting of hydrogen, alkoxy, halogen, and hydroxyl.

Suitable organofunctional silanes for use in the present invention have the general structure of Formula 1 noted above. Exemplary organofunctional silane coupling agents that are useful for the present invention include those with the structure: $Si(R^1)(R^2)(R^3)(R^4)$, in which $R^1$, $R^2$, $R^3$, and $R^4$ may the same or different and are independently selected from the group consisting of hydrogen, alkyl, haloalkyl, alkylene, alkynyl, alkoxy, alkynoxy, aryl, aryloxy, substituted aromatic, heteroaromatic, amino, aminoalkyl, arylamino, epoxide, thiol, and haloalkyl, ether, ester, urethane, amide, provided that at least one of $R^1$, $R^2$, $R^3$, and $R^4$ comprises an organic moiety. Preferably, the oganofunctional silane coupling agent includes an organic functionality selected from the group consisting of methyl, epoxide, melamine functionalized with an epoxide or copolymerized with an epoxy, amino, mercapto, chloropropyl, methacryl, methacryloxy, vinyl, benzylamino, ureido, tetrasulfido, and C1-C4 alkoxy groups. Even more preferably, the organofunctional silane is selected from the group consisting of mercaptosilanes possessing at least one hydroxyalkoxysilyl group and/or a cyclic dialkoxysilyl group, blocked mercaptosilane possessing at least one hydroxyalkoxysilyl group and/or a cyclic dialkoxysilyl group; mercaptosilanes in which the silicon atoms of the mercaptosilane units are bonded to each other through a bridging dialkoxy group, each silane unit optionally possessing at least one hydroxyalkoxysilyl group or a cyclic dialkoxysilyl group; blocked mercaptosilane dimers in which the silicon atoms of the blocked mercaptosilane units are bonded to each other through a bridging dialkoxy group, each silane unit optionally possessing at least one hydroxyalkoxysilyl group or a cyclic dialkoxysilyl group; silane dimers possessing a mercaptosilane unit the silicon atom of which is bonded to the silicon atom of a blocked mercaptosilane unit through a bridging dialkoxy group, each silane unit optionally possessing at least one hydroxyalkoxysilyl group or a cyclic dialkoxysilyl group; mercaptosilane oligomers in which the silicon atoms of adjacent mercaptosilane units are bonded to each other through a bridging dialkoxy group, the terminal mercaptosilane units possessing at least one hydroxyalkoxysilyl group or a cyclic dialkoxysilyl group; blocked mercaptosilane oligomers in which the silicon atoms of adjacent blocked mercaptosilane units are bonded to each other through a bridging dialkoxy group, the terminal mercaptosilane units possessing at least one hydroxyalkoxysilyl group or a cyclic dialkoxysilyl group; and silane oligomers possessing at least one mercaptosilane unit and at least one blocked mercaptosilane unit, the silicon atoms of adjacent silane units being bonded to each other through a bridging dialkoxy group, the terminal silane units possessing at least one hydroxyalkoxysilyl group or a cyclic dialkoxysilyl group.

Specific examples of useful organofunctional silane coupling agents for use in the outer coating layer of proppants according to the invention include 3-glycidyloxypropyltrimethoxysilane, 3-glycidyloxypropyltriethoxysilane, 2-(3,4-epoxycyclohexyl)ethyltrimethoxysilane, and 2-(3,4-epoxycyclohexyl)ethyltriethoxysilane; 3-[2-(2-aminoethylamino)ethylamino]propyl-trimethoxysilane (CAS No. 35141-30-1); 3-mercaptopropyl-trimethoxysilane (CAS No. 4420-74-0); n-propyltrimethoxysilane (CAS No. 1067-25-0); [3-(2-aminoethyl)aminopropyl]trimethoxysilane (CAS No. 1760-24-3); silane n-dodecyltrimethoxysilane (CAS No. 3069-21-4); bis (trimethoxysilylpropyl) amine (CAS No. 82985-35-1); 1,2-bis(trimethoxysilyl)ethane (CAS No. 18406-41-2); vinyltri(2-methoxyethoxy) silane (CAS No. 1067-53-4); n-octyltriethoxysilane (CAS No. 2943-75-1); bis[3-(triethoxysilyl) propyl]tetrasulfide (CAS No. 40372-72-3); vinyltriethoxysilane (CAS No. 78-08-0); 3-glycidoxypropyl-trimethoxysilane (CAS No. 2530-83-8); 3-mercaptopropyl-triethoxysilane (CAS No. 14814-09-6); 3-glycidoxypropyl-triethoxysilane (CAS No. 2602-34-8); 2-(3,4-epoxycyclohexyl)ethyl]trimethoxysilane (CAS No. 3388-04-3); 3-aminopropyltrimethoxysilane (CAS No. 13822-56-5); 2-(3,4-epoxycyclohexyl)ethyl]triethoxysilane (CAS No. 10217-34-2); 3-aminopropyltriethoxysilane (CAS No. 919-30-2); 3-glycidoxypropyl-methyldimethoxysilane (CAS No. 65799-47-5); bis (triethoxysilylpropyl)amine (CAS No. 13497-18-2); 3-(2-aminoethylamino) propyldimethoxymethylsilane (CAS No. 3069-29-2); N-(n-Butyl)-3-aminopropyltri-methoxysilane (CAS No. 31024-56-3); n-propyltriethoxysilane (CAS No. 2550-02-9); vinyltrimethoxysilane (CAS No. 2768-02-7); 3-ureidopropyltriethoxy-silane (CAS No. 23779-32-0); 3-methacryloxypropyl-trimethoxysilane (CAS No. 2530-85-0).

Amine-functional silane compounds are especially preferred as adhesion promoters in the present invention. See U.S. Pat. Nos. 6,071,990 and 8,349,911 the disclosures of which are hereby incorporated by reference. Such amine-functional silanes are preferably (aminoalkyl) alkoxysilanes represented by the general Formula 3:

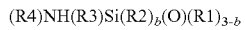

Formula 3 wherein R1 and R2 are monovalent hydrocarbon groups having 1 to 4 carbons independently selected from a group comprising methyl, ethyl, propyl or butyl, and
b has a value of 0 or 1;
R3 is a divalent hydrocarbon group represented by the formula $(CH_2)_x$ wherein x is a positive integer of from 3 to 10; and
R4 is selected from the group comprising hydrogen, a monovalent hydrocarbon group having one to four carbons or a group represented by the formula, (R5)NH(R3) wherein R3 is as defined above and R5 is hydrogen or a monovalent hydrocarbon group having 1 to 4 carbons. Examples of groups represented by R4 comprise methyl, ethyl, propyl, butyl, aminomethyl, aminoethyl, aminopropyl, aminobutyl, ethylaminopropyl and aminoethylaminoethyl.

Examples of commonly available amine functional silane compounds within the above general formulae include aminopropyltriethoxysilane (DYNASYLAN® AMEO from Evonik Industries), aminopropyltrimethoxysilane (DYNASYLAN® AMMO), aminoethylaminopropyltrimethoxysilane (DYNASYLAN® AEAPTMS), and aminoethylaminoethylaminopropyltrimethoxysilane (DYNASYLAN® TAS).

Another type of organofunctional silanes that are useful in the present invention are silane-terminated polymers, such as silane-terminated polyethers and polyurethanes. These polymers are formed by reaction of for instance a polyether polymer with isocyanate termination with aminosilanes or a polyether polymer with amino termination and/or hydroxyl termination with isocyanate-terminated silanes. Reactions of the reactive groups with other materials in the composition is also possible to create other cross-links. Silane-terminated polymers (STP) or silane-modified polymers (MS) can be all pre-polymers which at the chain ends—or laterally—carry silyl groups having at least one hydrolysable bond but which in the polymer framework, do not display the siloxane bond (SiR2O)n that is typical of silicones. Two preferred silane-terminated polymers are illustrated by Formulas 4 (a dimethoxy(methyl)silylmethylcarbamate-terminated polyether) and 5:

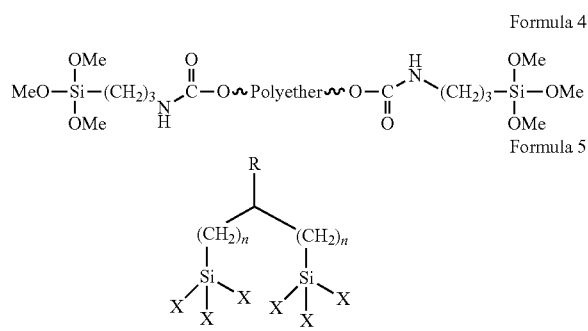

Formula 4

Formula 5

Wherein for Formula 4: Polyether refers to a polyether chain having 1-200 carbon atoms. See also published U.S. Pat. Nos. 3,971,751 and 6,207,766 as well as US patent application publication number US 2007/0088137, the disclosures of which are hereby incorporated by reference.

Wherein for Formula 5: R is an amine group; each X in Formula 5 can each be independently selected from the group consisting of hydrogen, alkoxy, halogen, and hydroxyl; and n is an integer that is greater than zero. Such agents are commercially available from Wacker Chemie AG, Hanns-Seidel-Platz 4, 81737 Munchen, Germany under the designation Geniosil® STP-E.

The dipodal silane-terminated polyether-based polymers of Formulas 4-5 are compatible or miscible with polyether polyols that can be used as the polyol component for making a polyurethane proppant coating. Such silane-terminated polyether-based polymers are easily blended with polyether polyols as a last step top-coat to provide an adhesive coating layer for coated proppants according to the invention. The dipodal amino silane of Formula 4 in the form of bis (trimethoxysilylpropyl)amine has been used as a coupling agent in the proppants industry for "difficult" substrates. In the present invention, this silane could provide two silane, adhesive-like, functionalities for every amine (—NC=O) grafting moiety.

The length of the carbon chain in the alkoxy moieties (e.g., methoxy vs. ethoxy vs. propoxy vs. butoxy) determine the rate of hydrolysis of the silane. So, the choice of the length of the alkoxy carbon chain can be used to provide control over the resulting moisture and water resistance. Increasing resistance is seen as the alkyl chain increases. Longer carbon length chains will also delay the hydrolysis and, therefore, the bonding performance of the proppant in the fracture.

A wide variety of polymers can be used as the inner and/or outer coating layers for proppants of the present invention. Indeed, the coating layers can be thermoset or thermoplastic and may the same, different, analogues or homologues of the other and any intervening proppant coating layers. Exemplary polymer coatings include polyurethanes, polyurea-type polymers, phenolic resins, phenol-formaldehyde resins, and polycarbodiimides.

The preferred proppant coatings for the present invention and their manufacture are polyurethane and polyurea-type coatings. These coatings are described in more detail in co-pending U.S. patent application Ser. No. 13/099,893 (entitled "Coated and Cured Proppants"); Ser. No. 13/188,530 (entitled "Coated and Cured Proppants"); Ser. No. 13/626,055 (entitled "Coated and Cured Proppants"); Ser. No. 13/224,726 (entitled "Dual Function Proppants"); Ser. No. 13/355,969 (entitled "Manufacture of Polymer Coated Proppants"); and Ser. No. 13/837,396 (entitled "Proppant With Polyurea-Type Coating"), the disclosures of which are herein incorporated by reference.

Particularly preferred proppant coatings as the inner and/or outer layers are those using polyurea-based or polyurethane-based polymers. The polyurea-type coating is preferably formed on the proppant from a dynamically reacting mixture that comprises an isocyanate, water and a curing agent (preferably an aqueous solution containing a curing agent or catalyst) that have been simultaneous contacted and mixed in the presence of the proppant core. While not wishing to be bound by theory of operation, the controlled rates of substantially simultaneous water and isocyanate are believed to allow the water to form a reactive amine species from the isocyanate, which newly-formed amine then reacts with other, unconverted isocyanate to form the desired polyurea-type coating directly on the outer surface of the proppant solid. Thus, the simultaneous contact among the ingredients forms a reacting mixture that polymerizes to form a thin, hard, substantially foam-free coating directly on the outer surface of the proppant core. If the sand has been heated in advance of the contact, the reaction can proceed substantially to completion in less than about four minutes to form a hard, substantially fully-cured coating that does not require post-curing to form a tack-free or substantially tack-free outer surface.

Alternatively and less preferably, a polyurea-type coating can be formed on the proppant core by serially adding polyurea-type precursor components to the mixer. Such a process would likely need, however, sufficient agitation and mixing to avoid boundary layer effects from the first-added component that would cover the surface of the proppant core to a certain depth which might inhibit a complete reaction of all of the first material down to the surface of the proppant core solid. Sufficient agitation would be used to force the second component into the boundary layer of first component so that the first component boundary layer reacts downwardly from its outer surface towards the outer surface of the proppant core to form linkages that are tightly adhered to the proppant core surface.

Similar concerns would occur if the proppant core had been stored under external conditions and had become wet. It would be desirable to heat the proppant core above about 100° C., possibly less with moving air through the solids, until the proppants are substantially dry before they are first contacted with a reactable or reacting mixture of polyurea-type precursors. Such a drying process is commonly used in processing even uncoated sand proppants, the present coating process is preferably performed in the same or adjacent facility as the drying operation so that the sensible heat introduced to the sand for drying can also be used to facilitate the formation of cured coatings on at least a portion of the processed proppant sands.

Tests on the coating to determine its glass transition temperature (Tg) as well as laboratory-scale tests for bond strength, such as conventional UCS testing, or conductivity can be used to evaluate the suitability of any particular coating formulation that has been prepared by a particular coating method. In particular, the Tg can be used as a guide to foretell whether a thermoplastic coating (such as those of the present invention, the polyurethanes described by our copending patent applications that were noted above and incorporated by reference, or those of the previously noted Tanguay et al. patent applications) are potentially useable in the downhole conditions of a given fractured stratum. It is desirable that the Tg of the proppant coating be a temperature that is less than that prevailing downhole so that the thermoplastic coating has the ability to soften under prevailing combination of temperature and pressure. For the present invention and for use in high temperature wells, the Tg of the proppant coating is preferably greater than about 75° C. but less than about 200° C. and even more preferably within the range from about 100-165° C. For lower temperature wells, those with downhole temperatures within the range of 20°-52° C., the Tg of the proppant coating is desirably within the range of about 20° C. to 60° C.

A preferred testing method for proppant performance is described in ISO 13503-5:2006(E) "Procedures for measuring the long term conductivity of proppants", the disclosure of which is herein incorporated by reference. The ISO 13503-5:2006 provides standard testing procedures for evaluating proppants used in hydraulic fracturing and gravel packing operations. ISO 13503-5:2006 provides a consistent methodology for testing performed on hydraulic fracturing and/or gravel packing proppants. The "proppants" mentioned henceforth in this part of ISO 13503-5:2006 refer to sand, ceramic media, resin-coated proppants, gravel packing media, and other materials used for hydraulic fracturing and gravel-packing operations. ISO 13503-5:2006 is not applicable for use in obtaining absolute values of proppant pack conductivities under downhole reservoir conditions, but it does serve as a consistent method by which such downhole conditions can be simulated and compared in a laboratory setting.

The Isocyanate Component

The isocyanate-functional component for the coatings of the present invention comprises an isocyanate-functional component with at least 2 reactive isocyanate groups. Other isocyanate-containing compounds may be used, if desired. Examples of suitable isocyanate with at least 2 isocyanate groups an aliphatic or an aromatic isocyanate with at least 2 isocyanate groups (e.g. a diisocyanate, triisocyanate or tetraisocyanate), or an oligomer or a polymer thereof can preferably be used. These isocyanates with at least 2 isocyanate groups can also be carbocyclic or heterocyclic and/or contain one or more heterocyclic groups.

The isocyanate-functional component with at least 2 isocyanate groups is preferably a compound, polymer or oligomer of compounds of the formula (III) or a compound of the formula (IV):

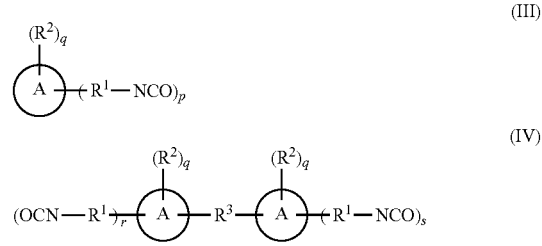

In the formulas (III) and (IV), A is each, independently, an aryl, heteroaryl, cycloalkyl or heterocycloalkyl. Preferably, A is each, independently, an aryl or cycloalkyl. More preferably A is each, independently, an aryl which is preferably phenyl, naphthyl or anthracenyl, and most preferably phenyl. Still more preferably A is a phenyl.

The above mentioned heteroaryl is preferably a heteroaryl with 5 or 6 ring atoms, of which 1, 2 or 3 ring atoms are each, independently, an oxygen, sulfur or nitrogen atom and the other ring atoms are carbon atoms. More preferably the heteroaryl is selected among pyridinyl, thienyl, furyl, pyrrolyl, imidazolyl, pyrazolyl, pyrazinyl, pyrimidinyl, pyridazinyl, oxazolyl, isoxazolyl or furazanyl.

The above mentioned cycloalkyl is preferably a $C_{3-10}$-cycloalkyl, more preferably a $C_{5-7}$-cycloalkyl.

The above mentioned heterocycloalkyl is preferably a heterocycloalkyl with 3 to 10 ring atoms (more preferably with 5 to 7 ring atoms), of which one or more (e.g. 1, 2 or 3) ring atoms are each, independently, an oxygen, sulfur or nitrogen atom and the other ring atoms are carbon atoms. More preferably the heterocycloalkyl is selected from among tetrahydrofuranyl, piperidinyl, piperazinyl, aziridinyl, acetidinyl, pyrrolidinyl, imidazolidinyl, morpholinyl, pyrazolidinyl, tetrahydrothienyl, octahydroquinolinyl, octahydroisoquinolinyl, oxazolidinyl or isoxazolidinyl. Still more preferably, the heterocycloalkyl is selected from among tetrahydrofuranyl, piperidinyl, piperazinyl, pyrrolidinyl, imidazolidinyl, morpholinyl, pyrazolidinyl, tetrahydrothienyl, oxazolidinyl or isoxazolidinyl.

In the formulas (III) and (IV), each $R^1$ is, independently, a covalent bond or $C_{1-4}$-alkylene (e.g. methylene, ethylene, propylene or butylene). Preferably each $R^2$ is hydrogen or a covalent bond.

In the formulas (III) and (IV), each $R^2$ is each, independently, hydrogen, a halogen (e.g. F, Cl, Br or I), a $C_{1-4}$-alkyl (e.g. methyl, ethyl, propyl or butyl) or $C_{1-4}$-alkyoxy (e.g. methoxy, ethoxy, propoxy or butoxy). Preferably, each $R^2$ is, independently, hydrogen or a $C_{1-4}$-alkyl. More preferably each $R^2$ is hydrogen or methyl.

In the formula (IV), $R^3$ is a covalent bond, a $C_{1-4}$-alkylene (e.g. methylene, ethylene, propylene or butylene) or a group —$(CH_2)_{R31}$—O—$(CH_2)_{R32}$—, wherein R31 and R32 are each, independently, 0, 1, 2 or 3. Preferably, $R^3$ is a —$CH_2$— group or an —O— group.

In the formula (III), p is equal to 2, 3 or 4, preferably 2 or 3, more preferably 2.

In the formulas (III) and (IV), each q is, independently, an integer from 0 to 4, preferably 0, 1 or 2. When q is equal to 0, the corresponding group A has no substituent $R^2$, but has hydrogen atoms instead of $R^2$.

In the formula (IV), each r and s are, independently, 0, 1, 2, 3 or 4, wherein the sum of r and s is equal to 2, 3 or 4. Preferably, each r and s are, independently, 0, 1 or 2, wherein the sum of r and s is equal to 2. More preferably, r is equal to 1 and s is equal to 1.

Examples of the isocyanate with at least 2 isocyanate groups are: toluol-2,4-diisocyanate; toluol-2,6-diisocyanate; 1,5-naphthalindiisocyanate; cumol-2,4-diisocyanate; 4-methoxy-1,3-phenyldiisocyanate; 4-chloro-1,3-phenyldiisocyanate; diphenylmethane-4,4-diisocyanate; diphenylmethane-2,4-diisocyanate; diphenylmethane-2,2-diisocyanate; 4-bromo-1,3-phenyldiisocyanate; 4-ethoxy-1,3-phenyl-diisocyanate; 2,4'-diisocyanate diphenylether; 5,6-dimethyl-1,3-phenyl-diisocyanate; methylenediphenyl diisocyanate (including 2,2'-MDI, 2,4'-MDI and 4,4"-MDI); 4,4-diisocyanato-diphenylether; 4,6-dimethyl-1,3-phenyl-diisocyanate; 9,10-anthracene-diisocyanate; 2,4,6-toluol triisocyanate; 2,4,4'-triisocyanatodiphenylether; 1,4-tetramethylene diisocyanate; 1,6-hexamethylene diisocyanate; 1,10-decamethylene-diisocyanate; 1,3-cyclohexylene diisocyanate; 4,4'-methylene-bis-(cyclohexylisocyanate); xylol diisocyanate; 1-isocyanato-3-methyl-isocyanate-3,5,5-trimethylcyclohexane (isophorone diisocyanate); 1-3-bis(isocyanato-1-methylethyl) benzol (m-TMXDI); 1,4-bis(isocyanato-1-methylethyl) benzol (p-TMXDI); oligomers or polymers of the above mentioned isocyanate compounds; or mixtures of two or more of the above mentioned isocyanate compounds or oligomers or polymers thereof. A variety of polymeric isocyanates can be used in the present invention. Suitable examples include polymers and oligomers of diphenylmethane diisocyanates (MDIs and pMDIs), toluene diisocyanates (TDIs), hexamethylene diisocyanates (HDIs), isophorone diisocyanates (IPDIs), and combinations thereof. The preferred polymeric isocyanate for use in the present invention is polymers and oligomers based on diphenylmethane diisocyanates.

Particularly preferred isocyanates with at least 2 isocyanate groups are toluol diisocyanate, methylenediphenyl diisocyanate, diphenylmethane diisocyanate, an oligomer based on toluol diisocyanate, an oligomer based on methylenediphenyl diisocyanate (poly-MDI) or an oligomer based on diphenylmethane diisocyanate and polymers thereof.

The Polyol Component

A polyol component with polyhydroxy functionality is one of the components used in making a polyurethane coating on proppant solids in a process according to the invention, and it may be applied as the first component or the second component. The polyol component has two or more functional, hydroxyl moieties (such as diols, triols and higher polyol functionality based on starter molecules like glycerine, trimethylolpropane, sorbitol, methyl glucoside and sucrose) excluding hydroxyl groups associated with carboxylic acids and may or may not have reactive amine functionality. Preferred polyhydroxyl polyols include polyethers (such as polyoxypropylene diols and triols), polyesters, aliphatic polyols, aromatic polyols, mixtures of aliphatic and aromatic polyols, synthetic polyols, polyhydroxyoligomers (see U.S. Pat. Nos. 4,554,188 and 4,465,815, the disclosures of which are hereby incorporated by reference), natural oil polyols (such as cashew nut oil and castor oil) and natural oils that have been treated to introduce polyhydroxyl content in place of unsaturated bonds such as oxidized soybean oil, oxidized peanut oil, and oxidized canola oil such as polyols produced from biomass.

A preferred polyurethane coating is made with a polyol mixture that includes 5-100 wt % of one or more polyether, polyester, aliphatic and/or polyhydroxyoligomers polyols and 0-95 wt % of an aromatic polyol. An especially preferred polyol contains 0-50 wt % cashew nut oil, 0-60 wt % aromatic polyol and 20-100% castor oil. It appears that an optimum ratio of castor oil to isocyanate in the coating mixture results in lower LOI loss as well as higher interparticle bond strength than coatings with lower proportions of castor oil in the coating.

In a still further embodiment, the polyol component is a phenol resin with monomer units based on cardol and/or cardanol. Cardol and cardanol are produced from cashew nut oil which is obtained from the seeds of the cashew nut tree. Cashew nut oil consists of about 90% anacardic acid and about 10% cardol. By heat treatment in an acid environment, a mixture of cardol and cardanol is obtained by decarboxylation of the anacardic acid. Cardol and cardanol have the structures shown below:

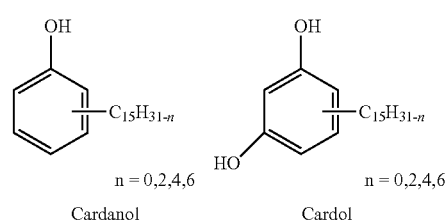

Cardanol  n = 0,2,4,6     Cardol  n = 0,2,4,6

As shown in the illustration above, the hydrocarbon residue ($—C_{15}H_{31-n}$) in cardol and/or in cardanol can have one (n=2), two (n=4) or three (n=6) double bonds. Cardol specifically refers to compound CAS-No. 57486-25-6 and cardanol specifically to compound CAS-No. 37330-39-5.

Cardol and cardanol can each be used alone or at any particular mixing ratio in the phenol resin. Decarboxylated cashew nut oil can also be used.

Cardol and/or cardanol can be condensed into the above described phenol resins, for example, into the resole- or novolak-type phenol resins. For this purpose, cardol and/or cardanol can be condensed e.g. with phenol or with one or more of the above defined compounds of the formula (I), and also with aldehydes, preferably formaldehyde.

The amount of cardol and/or cardanol which is condensed in the phenol resin is not particularly restricted and preferably is from about 1 wt % to about 99 wt %, more preferably about 5 wt % to about 60 wt %, and still more preferably about 10 wt % to about 30 wt %, relative to 100 wt % of the amount of phenolic starting products used in the phenol resin.

In another embodiment, the polyol component is a phenol resin obtained by condensation of cardol and/or cardanol with aldehydes, preferably formaldehyde.

A phenol resin which contains monomer units based on cardol and/or cardanol as described above, or which can be obtained by condensation of cardol and/or cardanol with aldehydes, has a particularly low viscosity and can thus preferably be employed with a low addition or without addition of reactive thinners. Moreover, this kind of long-chain, substituted phenol resin is comparatively hydrophobic, which results in a favorable shelf life of the coated proppants obtained by the method according to the present invention. In addition, a phenol resin of this kind is also advantageous because cardol and cardanol are renewable raw materials.

Apart from the phenol resin, the polyol component can still contain other compounds containing hydroxyl groups. The other compounds containing hydroxyl groups can be selected from the compounds containing hydroxyl groups that are known to be useful for making polyurethanes, e.g., hydroxy-functional polyethers, hydroxy-functional polyesters, alcohols or glycols. One preferred compound containing hydroxyl groups is, for instance, castor oil. Compounds containing hydroxyl groups such as alcohols or glycols, in particular cardol and/or cardanol, can be used as reactive thinners.

Curing Agents and Catalysts

The coatings of the invention can be cured with at least one of a variety of curing agents, including reactive, non-reactive (e.g., "catalysts") and partially reactive agents that facilitate the formation of polyurea-type linkages. Generally, the preferred curing agents are selected from the amine-based curing agents and are added to the reacting mixture of polyurea-type precursors at a total amount within the range from about 0.0001% to about 30 total wt %. The amine-based curing agents may also be used as a mixture of a fast-acting first curing agent and a second, latent curing agent if additional crosslinking ability is desired to take advantage of downhole heat and pressure conditions. Either of these first and/or second amine-based curing agents may be reactive, nonreactive or partially reactive. If the amine curing agent is reactive, however, the amine is preferably chosen to favor the formation of polyurea by reaction with the isocyanate. Alkanolamines can also promote the formation of polyurea while also providing hydroxyl functionality that will facilitate the incorporation of the added coupling agents in the outer layer of the proppant coating according to the present invention.

Suitable single amine-based curing agent or a mixture of amine-based curing agents for promoting the formation of polyurea can include, but are not limited to, 2,2'-dimorpholinodiethyl ether; bis-dimethylaminoethylether; ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine), isomers, and mixtures thereof; diethylene glycol bis-(aminopropyl)ether; 2-methylpentamethylene-diamine; diaminocyclohexane, isomers, and mixtures thereof; diethylene triamine; triethylene tetramine; tetraethylene pentamine; propylene diamine; 1,3-diaminopropane; dimethylamino propylamine; diethylamino propylamine; imido-bis-(propylamine); monoethanolamine; diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 4,4'-bis-(sec-butylamino)-benzene; and derivatives thereof; 1,4-bis-(sec-butylamino)-benzene; 1,2-bis-(sec-butylamino)-benzene; N,N'-dialkylamino-diphenylmethane; trimethyleneglycol-ci-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine; polyoxypropylene diamine; propylene oxide-based triamine; 3,3'-dimethyl-4,4'-ciaminocyclohexylmethane; and mixtures thereof. In one embodiment, the amine-terminated curing agent is 4,4'-bis-(sec-butylamino)-dicyclohexylmethane. Preferred amine-based curing agents and catalysts that aid the —NCO— and water reaction to form the polyurea-type links for use with the present invention include triethylenediamine; bis(2-dimethylaminoethyl) ether; tetramethylethylenediamine; pentamethyldiethylenetriamine; 1,3,5-tris(3-(dimethylamino)propyl)-hexahydro-s-triazine and other tertiary amine products of alkyleneamines.

Additionally, other catalysts that promote the reaction of isocyanates with hydroxyls and amines that are known by the industry can be used in the present invention, e.g., transition metal catalysts of Groups III or IV used for polyurea-type foams. Particularly preferred metal catalysts include dubutyltin dilaurate and added to water for application during the coating process.

Also preferred are catalysts that promote isocyanate trimerization over other reaction mechanisms. See, e.g., U.S. Pat. No. 5,264,572 (cesium fluoride or tetraalkylammonium fluoride), U.S. Pat. No. 3,817,939 (organic carbonate salt), and U.S. Pat. No. 6,127,308 (lithium salts, lithium hydroxide, allophane catalysts such as tin-2-ethylhexanoate or tin octoate, and organic compounds containing at least one hydroxyl group), the disclosures of which are herein incorporated by reference. Phosphorous-based catalysts have been used to promote the formation of polycarbodiimides (see the examples in Tanguay et al. US 2011/0297383) and are not preferred for use in the present invention.

The amine-based curing agent may have a molecular weight of about 64 or greater. In one embodiment, the molecular weight of the amine-curing agent is about 2000 or less and is a primary or secondary amine. Tertiary amines will not generally be used as a reactant for forming polyurea-type coatings.

Of the list above, the saturated amine-based curing agents suitable for use to make polyurea-type coatings according to the present invention include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl) ether; 2-methylpentamethylene-diamine; diaminocyclohexane; diethylene triamine; triethylene tetramine; tetraethylene pentamine; propylene diamine; dipropylene triamine; 1,3-diaminopropane; dimethylamino propylamine; diethylamino propylamine; imido-bis-(propylamine); monoethanolamine, diethanolamine; monoisopropanolamine, diisopropanolamine; isophoronediamine; N,N'-diisopropylisophorone diamine and mixtures thereof.

In one embodiment, the curative used with the prepolymer include 3,5-dimethylthio-2,4-toluenediamine, 3,5-dimethyl-thio-2,6-toluenediamine, 4,4'-bis-(sec-butylamino)-diphenylmethane, N,N'-diisopropyl-isophorone diamine; polyoxypropylene diamine; propylene oxide-based triamine; 3,3'-dimethyl-4,4'-diaminocyclohexylmethane; and mixtures thereof.

Because unhindered primary diamines result in a rapid reaction between the isocyanate groups and the amine groups, in certain instances, a hindered secondary diamine may be more suitable for use. Without being bound to any particular theory, it is believed that an amine with a high level of stearic hindrance, e.g., a tertiary butyl group on the nitrogen atom, has a slower reaction rate than an amine with no hindrance or a low level of hindrance and further adds to the hydrolytic and thermal stability of the final product. For example, 4,4'-bis-(sec-butylamino)-dicyclohexylmethane (CLEARLINK 1000® from Huntsman Corporation in The Woodlands, Texas) may be suitable for use in combination with an isocyanate to form the polyurea-type coating. In addition, N,N'-diisopropyl-isophorone diamine, also available from Huntsman Corporation, under the tradename JEFFLINK®, may be used as the secondary diamine curing agent.

In addition, a trifunctional curing agent can be used to help improve cross-linking and, thus, to further improve the chemical and/or abrasion resistance of the coating. In one embodiment, a diethylene triamine or triethylene tetramine are both highly reactive and are desirably added to the coating process along with another, compatible component.

The curing agents of the present invention can be added to the coating formulation simultaneously with any of the other components or pre-coated on the proppant. Preferably, the curing agent is co-applied to the solid proppant core at substantially the same time that isocyanate is added with any of the other components, e.g., adding the curing agent with the polyol component.

Additives

The proppant coating compositions of the invention may also include various additives to the coating or the cured product that can change the appearance, properties, handling characteristics or performance of the coating as a proppant or in fracturing or breaker fluids. For example, the coatings of the invention may also include pigments, tints, dyes, and fillers in an amount to provide visible coloration in the coatings. Other materials include, but are not limited to, impact strength enhancers, reinforcing agents, reaction rate enhancers or catalysts, crosslinking agents, optical brighteners, propylene carbonates, coloring agents, fluorescent agents, whitening agents, UV absorbers, hindered amine light stabilizers, defoaming agents, processing aids, mica, talc, nano-fillers, silane coupling agents, anti-slip agents, water affinity or repulsion components, water-activated agents, viscosifiers, flowaids, anticaking agents, wetting agents, toughening agents such as one or more block copolymers, and components that act to remove at least some portion of the heavy metals and/or undesirable solutes found in subterranean groundwater. See, copending U.S. patent application Ser. No. 13/224,726 filed on 1 Sep. 2011 entitled "Dual Function Proppants", the disclosure of which is herein incorporated by reference.

The additives are preferably present in an amount of about 15 weight percent or less. In one embodiment, the additive is present in a non-zero amount of about 5 percent or less by weight of the coating composition.

The coated proppants can additionally be treated with surface-active agents, anticaking agents, or auxiliaries, such as talcum powder or stearate or other processing aids such as fine amorphous silica to improve pourability, wettability (even to the extent that a water wetting surfactant can be eliminated), dispersability, reduced static charge, dusting tendencies and storage properties of the coated product. A preferred group of additives are anticaking agents that help the handling characteristics of the coated and cured proppant to avoid agglomeration and to improve flow. Such anticaking agents include amorphous silica (e.g., silica flour, fumed silica and silica dispersions) and silica alternatives (such as those used in sandblasting as an alternative to silica or organofunctional silane like the DYNASYLAN fluids from Evonik Degussa Corporation in Chester, PA). These agents are available as powders or dispersions. They are applied to the outer surfaces of the coated proppant solid to prevent the formation of agglomerates during packing and shipping. Amorphous silica is preferably applied in an amount generally within the range from about 0.001 wt % to about 1 wt % based on the dry proppant weight.

Adhesion promoters can be used to increase the bond strength between the outer surface of the proppant core solid and the applied polymeric coating. Silanes are a particularly preferred type of adhesion promoter agent that improves the affinity of the coating resin for the surface of the proppant core solid and is particularly useful when sand is the proppant core. Organofunctional titanates and zirconates may also be used when coating a ceramic core solid. The adhesion promoter can be mixed in as an additive during the initial stages of the coating process or applied as a separate pretreatment step for the core solid. Adhesion promoters can also be converted in situ on from reactive constituents of the polyol component or of the isocyanate component used in the proppant coating. Functional silanes such as aminosilanes, epoxy-, aryl- or vinyl silanes are commercially available. The amino-silanes are preferred.

An optional additional additive is a contaminant removal component that will remove, sequester, chelate or otherwise clean at least one contaminant, especially dissolved or otherwise ionic forms of heavy metals and naturally occurring radioactive materials (NORMS), from subterranean water or hydrocarbon deposits within a fractured stratum while also propping open cracks in said fractured stratum. Preferably, the contaminant removal component is associated with the proppant solid as a chemically distinct solid that is introduced together with the proppant solid as: (a) an insoluble solid secured to the outer or inner surface of the proppant solid with a coating formulation that binds the solids together, (b) as a solid lodged within pores of the proppant solid or (c) as a chemical compound or moiety that is mixed into or integrated with a coating or the structure of the proppant solid. See copending U.S. patent application Ser. No. 13/224,726 filed on 2 Sep. 2011 entitled "Dual Function Proppants" the disclosure of which is herein incorporated by reference. Additional added functionality can also be in the form of fracture fluid breakers, de-emulsifiers, and bactericides.

The added functionality of an auxiliary particle to the proppant may also be in the form of an ion exchange resin that is pretreated or which itself constitutes a dissolvable solid for the slow release of corrosion or scale inhibitors. Such slow release materials could prove beneficial and advantageous to the overall operation and maintenance of the well.

Other useful additives to the proppant coating or applied to the outer surface of the cured coating include scale inhibitors, paraffin inhibitors, biocides, gel breakers, hydrogen sulfide scavengers or scavengers of other undesirable components found in fractured strata.

Proppant Core Solids

The proppants can be virtually any small solid with an adequate crush strength and lack of chemical reactivity. Suitable examples include sand, ceramic particles (such as aluminum oxide, silicon dioxide, titanium dioxide, zinc oxide, zirconium dioxide, cerium dioxide, manganese dioxide, iron oxide, calcium oxide, magnesium oxide, or bauxite), or also other granular materials.

Proppant sands are a preferred type of proppant for the present invention. Sand is mainly used in the hydraulic fracturing process of natural gas and oil wells to increase their productivity of valuable natural resources. Proppant sand is monocrystalline with a high silica content of at least 80 wt %, and more typically has a silica content of greater than about 97 wt % silica.

The American Petroleum Institute specifications place the following limitations on sieve distribution for proppants suitable for use in hydraulic fracturing:

At least 90% of material must fall between the two mesh sizes,

No more than 10% of the material may be coarser than the largest mesh size,

No more than 0.1% of the material may be coarser than the next largest mesh size, e.g. for 20/40, up to 10% of the proppant may be between 16 and 20 mesh, but no more than 0.1% can exceed 16 mesh, and No more than 1% of material is permitted to fall onto the pan.

Proppants are divided into low-density, medium density, high-density when determined in bulk. Proppant crush strengths are divided into 52 MPa, 69 MPa, 86 MPa and 103 MPa series. The size specifications of proppant sand are generally 12-18 mesh, 12-20 mesh, 16-20 mesh, 16-30 mesh, 20-40 mesh, between 30-50 mesh, 40-60 mesh, 40-70 mesh and smaller. The proppants to be coated preferably have an average particle size within the range from about 50 µm and about 3000 µm, and more preferably within the range from about 100 µm to about 2000 µm.

Coating Method

The coating process of the present invention produces a polyurea-type or polyurethane-type coating on the proppant core solids that is hard, durable and resists dissolution under the rigorous combination of high heat, agitation, abrasion and water found downhole in a fractured subterranean formation. Preferably, the cured coating exhibits a sufficient resistance (as reflected by a 10 day autoclave test or 10 day conductivity test) so that the coating resists loss by dissolution in hot water ("LOT loss") of less than 25 wt %, more preferably less than 15 wt %, and even more preferably a loss of less than 5 wt %. The substantially cured coating of the invention thus resists dissolution in the fractured stratum while also exhibiting sufficient consolidation and resistance to flow back without the use of an added bonding activator while also exhibiting sufficiently high crush strength to prop open the fractures and maintain their conductivity for extended periods.

The preferred process for making polyurethane-type coatings is described in copending U.S. patent application Ser. No. 13/355,969 (entitled "Manufacture of Polymer Coated Proppants") which is hereby incorporated by reference. Briefly summarized, the coating process of that invention is the formation of a polyurethane-based coating on a solid proppant core to form free-flowing, coated, proppant solids with the addition of water during the coating step as a processing aid for the formation of the coated proppants. Water is added at a rate or quantity sufficient to maintain the discrete, free-flowing characteristics of the proppant solids as the coating process proceeds yet avoid the formation of significant amounts of foam. The water also helps to reduce or eliminate the formation of viscous, resinous agglomerates or fouling masses of proppant solids that may be coated with only one of the polyurethane reactants (e.g., the polyol or the isocyanate) or with both components but at ratios that are not conducive to rapid formation of the desired polyurethane coating. Although the precise mechanism by which this effect occurs is not yet conclusively established so the present invention should not be bound by any particular theory of operation, the inventors believe that the water enables the reaction facilitates the formation of polyurea structures and reduces the number of unreacted —NCO bonds which elevates the thermal properties of the coating and helps increase the crosslink density quickly. It may be that the water acts as a reactive stabilizing fluid for these reactions because the final product is dry and free-flowing.

The temperature of the coating process is not particularly restricted outside of practical concerns for safety and component integrity. The preferred conditions for the coating/curing step of the present invention are generally at conditions within the range of about 50° to about 175° C., more preferably at a temperature within the range from about 75° C. to about 150° C., and most preferably at a temperature within the range from about 80° C. to about 135° C. As noted above, this temperature is conveniently achieved by heating or using heated proppant solids. The preferred temperature range avoids a number of emissions issues, reduces the amount of energy consumed in the coating process and also reduces the cooling time for the coated proppants for further handling and packaging.

Mixing can be carried out on a continuous or discontinuous basis in series or in several runs with a single mixer, but the specific mixer used to coat the proppants is not believed to be critical for the present invention. Suitable mixers include tumbling-type mixers, fluid beds, a pug mill mixer or an agitation mixer can be used. For example, a drum mixer, a plate-type mixer, a tubular mixer, a trough mixer or a conical mixer can be used. The easiest way is mixing in a rotating drum. As continuous mixer, a worm gear can, for example, be used.

A preferred mixer type is a tumbling-type mixer that uses a rotating drum driven by an electrical motor. The load on the motor can be used as a measure of the viscosity of the tumbling solids and the degree to which they are forming agglomerates or resinous deposits inside the mixer: the electrical load on the motor increases as the agglomeration and fouling increase. Adding water to the mixing solids or adding one or more of the polyurea precursor components in an aqueous solution, emulsion or suspension can help to reduce this load increase and retain the free-flowing nature of the mixing solids, thereby enabling even larger productivity from the mixer.

As noted above in describing the formation of polyurea-type coatings, water is preferably added to the isocyanate at a rate sufficient to form a reactive amine species which then reacts almost immediately with adjacent isocyanate to form polyurea. Preferably, water and an isocyanate-containing component are used in an amount within the range from about 5-30% water, 95-70% ISO consistent with the demands of the catalyst to promote the hydrolysis of the ISO and temperature of the substrate during the timed additions onto the proppant substrate. The water and isocyanate are added at a rate sufficient to maintain a proportion of 5-30 to 95-70 so as to promote the in-situ formation of a reactive amine component from the isocyanate which then reacts with unconverted isocyanate to make the polyurea-type coating of the present invention. These ratios also control the ultimate nature of the polyurea produced, whether driven to pre-cured, or controlled to retain a level of curability.

Most of the components for the coating are preferably added along with either the water, the polyol or the isocyanate to facilitate proper mixing and metering of the components. A silane adhesion promoter is preferably added to the heated sand to prepare the surface for adhesion to the applied polymeric coating. A colorant is added during the coating process by an injection line into the coating mixer. The amount added and the timing of when the component is added can affect the bond strength of the resulting coating to the core solid (adhesion promoter added early or as core solid pretreatment) and/or the degree to which interparticle bonds between adjacent, coated proppants is formed (adhesion promoter added late in coating process). A surfactant and/or flow aid can be added after the proppants have been coated to enhance wettability and enhanced flow properties with lower fines generation, respectively.

The method for the production of coated proppants according to the present invention can be implemented without the use of solvents. Accordingly, the mixture obtained in step (a) in one embodiment of the method is solvent-free, or is essentially solvent-free. The mixture is essentially solvent-free, if it contains less than 20 wt %, preferably less than 10 wt %, more preferably less than 5 wt %, and still more preferably less than 3 wt %, and most preferably less than 1 wt % of solvent, relative to the total mass of components of the mixture.

The coating is preferably performed at the same time as the curing of the coating on the proppant. In the present invention, the coated proppant becomes free-flowing at a time of less than 5 minutes, preferably within the range of 1-4 minutes, more preferably within the range of 1-3 minutes, and most preferably within the range of 1-2 minutes to form a coated, substantially cured, free-flowing, coated proppant. This short cycle time combines with the relatively moderate coating temperatures to form a coating/curing process that provides lower energy costs, smaller equipment, reduced emissions from the process and the associated scrubbing equipment, and overall increased production for the coating facility.

The coating material or combinations of different coating materials may be applied in more than one layer. For example, the coating process may be repeated as necessary (e.g. 1-5 times, 2-4 times or 2-3 times) to obtain the desired coating thickness.

Alternatively, polyurea-type or polyurethane-type coatings containing an outer layer that incorporates an adhesion promoter according to the invention can be applied as the outermost layer over an existing coating, e.g., a precured or curable phenolic coating. Such a layering process can take advantage of the underlying crush resistance and other properties of the phenolic coating while adding the bonding ability of the present polyurea-type or polyurethane-type coating. Such an outer coating would avoid the need for an added activator or surfactant compounds that are typically required for the phenolic coatings used in low temperature applications, e.g., low temperatures well of 50° C. and greater up to about 100° C. and thereby also avoid the potential for chemical incompatibility or interference with the formulated fracturing or breaker fluids used in hydraulic well fracturing. A typical size range for the final, coated proppant is desirably within the range of about 16 to about 100 mesh.

Polyurea-type and polyurethane-type coatings that contain an incorporated adhesion promoter can also be applied to a proppant that has been previously coated with a polyurea or polyurethane, or formed in situ as the last step of a continuous coating process in what is believed to be an outermost "skin" layer of the proppant coating. This skin layer of coating may increase surface tackiness. The addition of an anticaking agent, such as silica flour or the like, can be used to retain free-flow properties in the resulting proppant.

Similarly, utilizing the high reactivity of this polyurea system, a polyurea can be formed as the basecoat, followed by a topcoat of a phenolic, or epoxy, polyurethane or other coating with an incorporated adhesion promoter or coupling agent.

The amount of coating resin, that is, of the polyurea or polyurethane components that are applied to a proppant, is preferably between about 0.5 and about 10 wt %, more preferably between about 1% and about 5 wt %, resin relative to the mass of the proppant as 100 wt %. The amount of added adhesion promoter can be between about 0.0001 wt % to about 5 wt % relative to the mass of the proppant.

With the method according to the present invention proppants can be coated at temperatures between about 50° C. and about 175° C., preferably within the range of about 75°-125° C. and preferably in a solvent-free manner. The coating process requires a comparatively little equipment and, if necessary, can also be carried out near the sand or ceramic substrate source, near the geographically location of the producing field, or at/near the well itself.

If desired, and by no means is it required, the coated proppants can be baked or heated for a period of time sufficient to further enhance the ultimate performance of the coated particles and further react the available isocyanate, hydroxyl, amine and reactive adhesion promoter groups that might remain in the coated proppant. Such a post-coating cure may occur even if additional contact time with a catalyst is used after a first coating layer or between layers. Typically, the post-coating cure step is performed like a baking step at a temperature within the range from about 100°-200° C. for a time of about 1 minute to 4 hours, preferably the temperature is about 125°-200° C. for about 1-30 minutes.

Even more preferably, the coated proppant is cured for a time and under conditions sufficient to produce a coated proppant that exhibits a loss of coating of less than 25 wt %, preferably less than 15 wt %, and even more preferably less than 5 wt % when tested according to simulated downhole conditions under ISO 13503-5:2006(E). Even more preferably, the coated proppant of the present invention exhibits the low dust and handling characteristics of a conventional pre-cured proppant (see API RP 60) but also exhibits a crush test result at 10,000 psi of less than 10%, more preferably less than 5%, and especially less than 2%. The coated proppants of the invention preferably also have an unconfined compressive strength of greater than 20 psi and more preferably more than 500 psi with a fracture conductivity at a given closure stress that is substantially equal to, or greater than, the conductivity of a phenolic coating used in the same product application range.

Using the Coated Proppants

The invention also includes the use of the coated proppants in conjunction with a fracturing liquid to increase the production of petroleum or natural gas. Techniques for fracturing an unconsolidated formation that include injection of consolidating fluids are also well known in the art. See U.S. Pat. No. 6,732,800 the disclosure of which is herein incorporated by reference. Generally speaking, a fluid is injected through the wellbore into the formation at a pressure less than the fracturing pressure of the formation. The volume of consolidating fluid to be injected into the formation is a function of the formation pore volume to be treated and the ability of the consolidating fluid to penetrate the formation and can be readily determined by one of ordinary skill in the art. As a guideline, the formation volume to be treated relates to the height of the desired treated zone and the desired depth of penetration, and the depth of penetration is preferably at least about 30 cm radially into the formation. Please note that since the consolidation fluid is injected through the perforations, the treated zone actually stems from the aligned perforations.

Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. In order to maintain the fractures formed in the formation after the release of the fluid pressure, the fracturing fluid carries a proppant whose purpose is to prevent the fracturing from closing after pumping has been completed.

The fracturing liquid is not particularly restricted and can be selected from among the fracturing liquids, foams and gases known in the specific field. Suitable fracturing liquids are described, for example, in W C Lyons, G J Plisga, "Standard Handbook Of Petroleum And Natural Gas Engineering," Gulf Professional Publishing (2005). The fracturing liquid can be, for example, water gelled with polymers, an oil-in-water emulsion gelled with polymers, a water-in-oil emulsion gelled with polymers or liquefied petroleum gas. In one preferred embodiment, the fracturing liquid comprises the following constituents in the indicated proportions: 10001 water, 20 kg potassium chloride, 0.120 kg sodium acetate, 3.6 kg guar gum (water-soluble polymer), sodium hydroxide (as needed) to adjust a pH-value from 9 to 11, 0.120 kg sodium thiosulfate, 0.180 kg ammonium persulfate and optionally a crosslinker such as sodium borate or a combination of sodium borate and boric acid to enhance viscosity.

In addition, the invention relates to a method for the production of petroleum or natural gas which comprises the injection of the coated proppant into the fractured stratum with the fracturing liquid, i.e., the injection of a fracturing liquid which contains the coated proppant, into a petroleum- or natural gas-bearing rock layer, and/or its introduction into a fracture in the rock layer bearing petroleum or natural gas. The method is not particularly restricted and can be implemented in the manner known in the specific field. The concentration of proppant in the fracturing fluid can be any concentration known in the art, and will typically be in the range of about 0.5 to about 20 pounds of proppant added per gallon of clean fluid.

The fracturing fluid can contain an added proppant-retention agent, e.g. a fibrous material, a curable resin coated on the proppant, platelets, deformable particles, or a sticky proppant coating to trap proppant particles in the fracture and prevent their production through the wellbore. Fibers, in concentration that preferably ranges from about 0.1% to about 5.0% by weight of proppant, for example selected from natural organic fibers, synthetic organic fibers, glass fibers, carbon fibers, ceramic fibers, inorganic fibers, metal fibers and mixtures thereof, in combination with curable resin-coated proppants are particularly preferred. The proppant-retention agent is intended to keep proppant solids in the fracture, and the proppant and proppant-retention agent keep formation particles from being produced back out from the well in a process known as "flowback."

The enhanced proppants of the present invention are particularly well suited for enhancing the interparticle bonding characteristics of proppants designed for low temperature wells, e.g., those with downhole temperatures in the range of about 75-125° F. and crack closure stresses within the range of about 3000-6000 psi. With the present invention, interparticle bonding can be enhanced from negligible bond strength to good bonding. Depending on the polymer used in the coating, the present invention can introduce improved bending of 100-1000% or more (alternatively, this might be measured as a bond strength increase of 5-100 psi or more) relative to the same polymer without the added coupling agent in the outer layer portion of the proppant coating.

High temperature proppant coatings also benefit from the addition of a coupling agent in the outer layer portion of the coating. Such enhanced, high temperature coatings would normally be used in high temperature wells having downhole conditions of 200-350° F. and 6000-12,000 psi crack closure stress levels. At 200° F., such proppants exhibit 0-5 psi of interparticle bonding strength according to conventional UCS testing. With the present invention, however, these same proppants will exhibit interparticle bond strengths of 40-60 psi at 150° F. thereby extending the useful range across a wider range of downhole conditions.

EXAMPLE

Example 1—Polyurea Coating Process

The following is an example of a sequence for making a polyurethane-based coating according to the invention having a silane adhesion promoter between the proppant core and the inner layer of the proppant polymer coating and the same silane adhesion promoter added into the later duration of the addition sequence to incorporate the adhesion promoter into the outer layer of the proppant coating.

| ADDITION CYCLE (Low temperature polyurethane coating) | |
|---|---|
| Time(start/stop)(m:s) | Step |
| 0:00 | 2000 g of preheated sand (200 F.) is added to a lab mixer |
| 0:00/0:05 | 1.2 g of aminopropyltriethoxysilane silane is added with mixing over a 5 sec period |
| 0:15/1:05 | 31.56 g of polyMDI is added over a 50 second period |
| 0:20/0:55 | 28.44 g of a Polyol added over a 35 second period |
| 0:25/0:30 | 2 g of an oil based colorant is added over a 5 second period |
| 0:55/1:00 | 1.4 g of aminopropyltriethoxysilane silane is added with mixing over a 5 sec period |
| 1:40/1:45 | 8.0 g of an aqueous solution of silica anticaking agent |
| 2:00 | Coated sand is discharged.at 190° F. |

The advantage of the formulation in this example is the increased "bond-ability reflected in unconfined compressive strength (UCS) tests performed on the resulting product due to the adhesive-like nature of the isocyanate-silane outer layer. The sticky nature of this particular coating increases the risk of "caking" while in storage and handling so silica anti-caking agent is added at the end of the cycle to protect the product from caking and agglomeration during storage.

Once those skilled in the art are taught the invention, many variations and modifications are possible without departing from the inventive concepts disclosed herein. The invention, therefore, is not to be restricted except in the spirit of the appended claims.

What is claimed:

1. A coated proppant comprising: a core and a polymeric inner coating layer portion adjacent said core and an outer coating layer portion that comprises an organofunctional silane coupling agent, wherein the organofunctional silane coupling agent is exposed on the outer surface of the coated proppant and can form bonds with other organofunctional silane coupling agents exposed on proppants adjacent to the coated proppant.

2. A coated proppant according to claim 1, wherein said organofunctional silane coupling agent has the general structure: $Si(R_1)(R_2)(R_3)(R_4)$, in which $R_1$, $R_2$, $R_3$, and $R_4$ may the same or different and are independently selected from the group consisting of hydrogen, alkyl, halo alkyl, alkylene, alkynyl, alkoxy, alkynoxy, aryl, aryloxy, substituted aromatic, heteroaromatic, amino, aminoalkyl, arylamino, epoxide, thiol, and haloalkyl, ether, ester, urethane, amide, provided that at least one of $R_1$, $R_2$, $R_3$, and $R_4$ comprises an organic moiety.

3. A coated proppant according to claim 1, wherein said organofunctional silane comprises an organic functionality selected from the group consisting of methyl, amino, mercapto, chloropropyl, methacryl, methacryloxy, vinyl, benzylamino, ureido, tetrasulfido, and $C_1$-$C_4$ alkoxy groups.

4. A coated proppant according to claim 1, wherein said organofunctional silane is an aminofunctional silane.

5. A coated proppant according to claim 4, wherein said organofunctional silane is selected from the group consisting of aminopropyltriethoxysilane, aminopropyltrimethoxysilane, aminoethylaminopropyltrimethoxysilane, and aminoethylaminoethylaminopropyltrimethoxysilane.

6. A coated proppant according to claim 1, wherein said organofunctional silane is selected from the group consisting of 3-[2-(2-aminoethylamino)ethylamino]propyl-trimethoxysilane (CAS No. 35141-30-1); 3-mercaptopropyl-trimethoxysilane (CAS No. 4420-74-0); n-propyltrimethoxysilane (CAS No. 1067-25-0); [3-(2-aminoethyl)aminopropyl]trimethoxysilane (CAS No. 1760-24-3); silane n-dodecyltrimethoxysilane (CAS No. 3069-21-4); bis(trimethoxysilylpropyl) amine (CAS No. 82985-35-1); 1,2-bis(trimethoxysilyl)ethane (CAS No. 18406-41-2); vinyltri(2-methoxyethoxy) silane (CAS No. 1067-53-4); n-octyltriethoxysilane (CAS No. 2943-75-1); bis[3-(triethoxysilyl) propyl]tetrasulfide (CAS No. 40372-72-3); vinyltriethoxysilane (CAS No. 78-08-0); 3-glycidoxypropyl-trimethoxysilane (CAS No. 2530-83-8); 3-mercaptopropyl-triethoxysilane (CAS No. 14814-09-6); 3-glycidoxypropyl-triethoxysilane (CAS No. 2602-34-8); 2-(3,4-epoxycyclohexyl)ethyl]trimethoxysilane (CAS No. 3388-04-3); 3-aminopropyltrimethoxysilane (CAS No. 13822-56-5); 2-(3,4-epoxycyclohexyl)ethyl[triethoxysilane (CAS No. 10217-34-2); 3-aminopropyltriethoxysilane (CAS No. 919-30-2); 3-glycidoxypropyl-methyldimethoxysilane (CAS No. 65799-47-5); bis(triethoxysilylpropyl)amine (CAS No. 13497-18-2); 3-(2-aminoethylamino) propyldimethoxymethylsilane (CAS No. 3069-29-2); N-(n-Butyl)-3-aminopropyltri-methoxysilane (CAS No. 31024-56-3); n-propyltriethoxysilane (CAS No. 2550-02-9); vinyltrimethoxysilane (CAS No. 2768-02-7); 3-ureidopropyltriethoxy-silane (CAS No. 23779-32-0); and 3-methacryloxypropyl-trimethoxysilane (CAS No. 2530-85-0).

7. A coated proppant according to claim 1, wherein said organofunctional silane is selected from the group consisting of mercaptosilanes possessing at least one hydroxyalkoxysilyl group and/or a cyclic dialkoxysilyl group, blocked mercaptosilane possessing at least one hydroxyalkoxysilyl group and/or a cyclic dialkoxysilyl group; mercaptosilanes in which the silicon atoms of the mercaptosilane units are bonded to each other through a bridging dialkoxy group, each silane unit optionally possessing at least one hydroxyalkoxysilyl group or a cyclic dialkoxysilyl group; blocked mercaptosilane dimers in which the silicon atoms of the blocked mercaptosilane units are bonded to each other through a bridging dialkoxy group, each silane unit optionally possessing at least one hydroxyalkoxysilyl group or a cyclic dialkoxysilyl group; silane dimers possessing a mercaptosilane unit the silicon atom of which is bonded to the silicon atom of a blocked mercaptosilane unit through a bridging dialkoxy group, each silane unit optionally possessing at least one hydroxyalkoxysilyl group or a cyclic dialkoxysilyl group; mercaptosilane oligomers in which the silicon atoms of adjacent mercaptosilane units are bonded to each other through a bridging dialkoxy group, the terminal mercaptosilane units possessing at least one hydroxyalkoxysilyl group or a cyclic dialkoxysilyl group; blocked mercaptosilane oligomers in which the silicon atoms of adjacent blocked mercaptosilane units are bonded to each other through a bridging dialkoxy group, the terminal mercaptosilane units possessing at least one hydroxyalkoxysilyl group or a cyclic dialkoxysilyl group; and silane oligomers possessing at least one mercaptosilane unit and at least one blocked mercaptosilane unit, the silicon atoms of adjacent silane units being bonded to each other through a bridging dialkoxy group, the terminal silane units possessing at least one hydroxyalkoxysilyl group or a cyclic dialkoxysilyl group.

8. A coated proppant according to claim 1, wherein said organofunctional silane comprises a mixture of silanes.

9. A coated proppant according to claim 1, wherein said organofunctional silane comprises a silane-terminated polymer.

10. A coated proppant according to claim 9, wherein said organofunctional silane comprises a silane-terminated polyether or silane-terminated polyurethane.

11. A coated proppant according to claim 9, wherein said organofunctional silane is a silane-terminated polyether.

12. A coated proppant according to claim 9, wherein said organofunctional silane is a silane-terminated polyurethane.

13. A coated proppant according to claim 1, wherein the inner and outer layers are based on a polyurethane or a polyurea polymer.

14. A coated proppant according to claim 1, wherein said inner layer and said outer layer are based on different polymers.

15. A coated proppant according to claim 14, wherein said inner layer is a phenolic polymer and said outer layer is a polyurethane-based or polyurea-based polymer.

16. A coated proppant according to claim 14, wherein said inner layer is a phenolic polymer and said outer layer is a polyurethane-based polymer.

17. A coated proppant according to claim 14, wherein said inner layer is a phenolic polymer and said outer layer is a polyurea-based polymer.

18. A coated proppant according to claim 1, wherein the coated proppant shows an interparticle bond strength of 40-60 psi at 150° F.

19. A composition comprising a plurality of coated proppants according to claim 1, wherein the coated proppants comprising the organofunctional silane coupling agent exposed on the outer surface of the coated proppant binds to another organofunctional silane coupling agent exposed on an adjacent proppant comprising the second organofunctional silane coupling agent exposed on the outer surface.

20. A method for propping open a fractured strata by a process that comprises introducing into said fractured strata a coated proppant according to claim 1.

* * * * *